United States Patent [19]
Inoue et al.

[11] Patent Number: 5,835,162
[45] Date of Patent: Nov. 10, 1998

[54] SIGNAL SEPARATOR AND TELEVISION RECEIVER HAVING THE SAME

[75] Inventors: Satoshi Inoue, Kanagawa; Minoru Urushihara, Tokyo, both of Japan

[73] Assignee: Sony Corporation, Tokyo, Japan

[21] Appl. No.: 684,495

[22] Filed: Jul. 19, 1996

[30] Foreign Application Priority Data

Jul. 20, 1995 [JP] Japan ..................... 7-184470

[51] Int. Cl.⁶ .............. H04N 9/78; H04N 5/46
[52] U.S. Cl. ........................ 348/669; 348/556
[58] Field of Search ................... 348/663, 665, 348/667, 668, 669, 445, 453, 913, 555, 556, 554, 670, 664; H04N 9/78, 5/46

[56] References Cited

U.S. PATENT DOCUMENTS

| | | | |
|---|---|---|---|
| 5,003,389 | 3/1991 | Isobe et al. ........................... | 348/141 |
| 5,361,099 | 11/1994 | Kim ................................... | 348/555 |
| 5,510,847 | 4/1996 | Nio et al. ............................. | 348/554 |

*Primary Examiner*—Andrew I. Faile
*Assistant Examiner*—Ronald D. House
*Attorney, Agent, or Firm*—Frommer Lawrence & Haug LLP; William S. Frommer; Dennis M. Smid

[57] ABSTRACT

Upon NTSC broadcasting, switches are respectively electrically connected to the N sides and a three-dimensional comb filter is made up of memories, a subtracter, etc., whereby a carrier chrominance signal is separated from a video signal in accordance with a frame-to-frame process. In this case, the video signal is divided into two signals, which are in turn written into the memories. Upon EDTV2 broadcasting, the switches are respectively electrically connected to the E sides and a three-dimensional comb filter is made up of the memory and the subtracter, whereby a composite signal obtained by combining a carrier chrominance signal and a horizontal resolution supplementary signal is separated from the video signal. The switch is electrically connected to the E side and a three-dimensional comb filter is made up of the memory, a subtracter, etc., whereby a horizontal resolution supplementary signal is separated from a composite signal in accordance with a field-to-field process. The capacity of each of the memories can be efficiently used and hence a system can be integrated into compact form.

7 Claims, 24 Drawing Sheets

FIG. 8A CLK1 (14.3MHz)

FIG. 8B CLK2 (14.3×2MHz)

FIG. 8C SWc

FIG. 8D S51 (INPUT 8-BIT DATA)

FIG. 8I S56 (OUTPUT 4-BIT DATA)

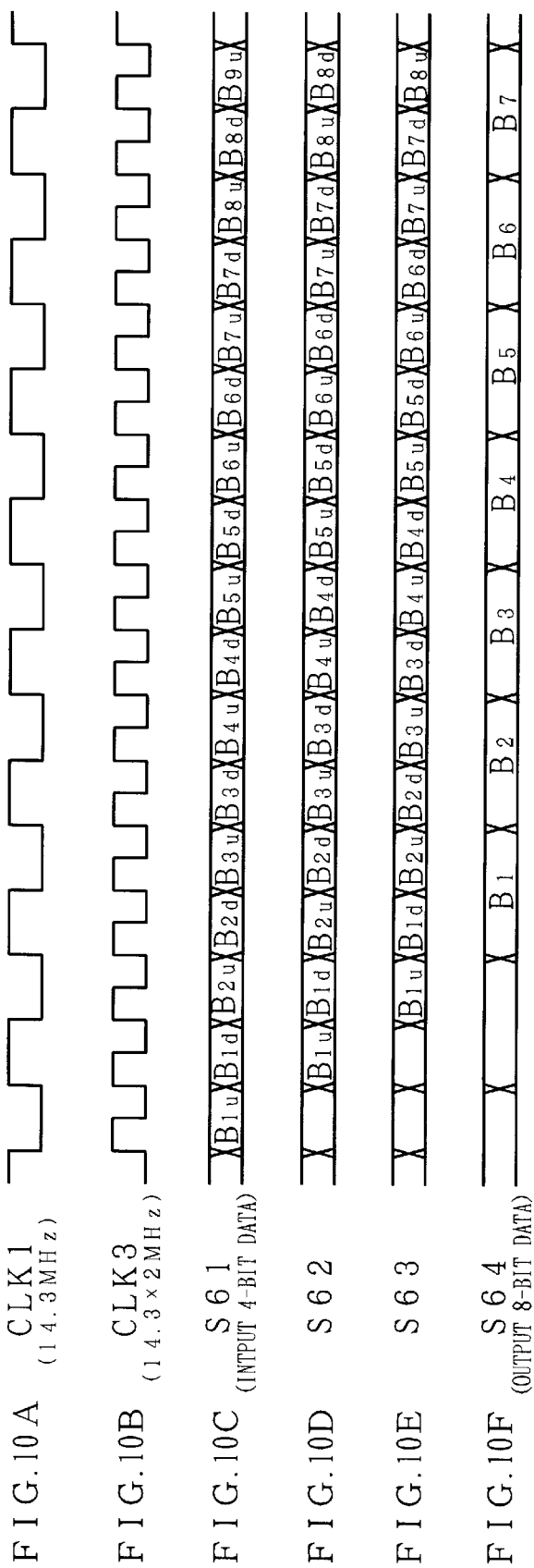

| | | | | | | | | | | | |
|---|---|---|---|---|---|---|---|---|---|---|---|
| FIG. 16A | CLK1 (14.3MHz) | | | | | | | | | | |
| FIG. 16B | SWe | b | a | b | a | b | a | | | | |
| FIG. 16C | REN | | | | | | | | | | |
| FIG. 16D | S81 (4-BIT DATA) | A3u | A3d | A6u | A6d | A9u | A9d | | | | |
| FIG. 16E | S82 | | | A3u | A3d | A6u | A6d | A9u | | | |
| FIG. 16F | S83 | | A1 | A2 | A3d | A3u | A6d | | | | |
| FIG. 16G | S84 (8-BIT DATA) | | A1 | A2 | A3 | A4 | A5 | A6 | A7 | A8 | |
| FIG. 16H | S85 | | A1 | A2 | A3 | A4 | A5 | A6 | A7 | A8 | |
| FIG. 16I | S86 | | | A2 | A3 | A4 | A5 | A6 | A7 | A8 | |
| FIG. 16J | S87 (8-BIT DATA) | | A1 | A2 | A3 | A4 | A5 | A6 | A7 | | |

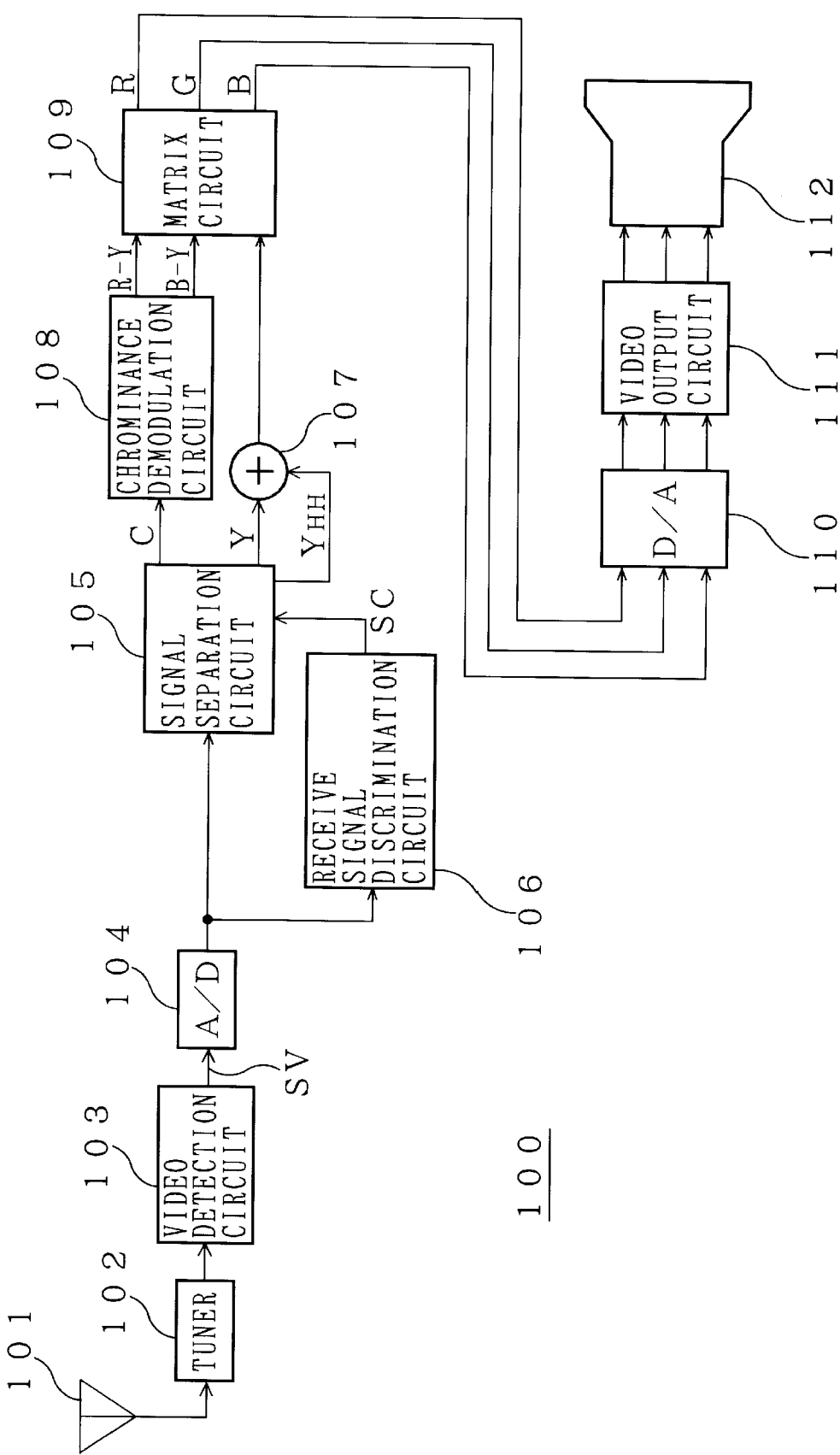

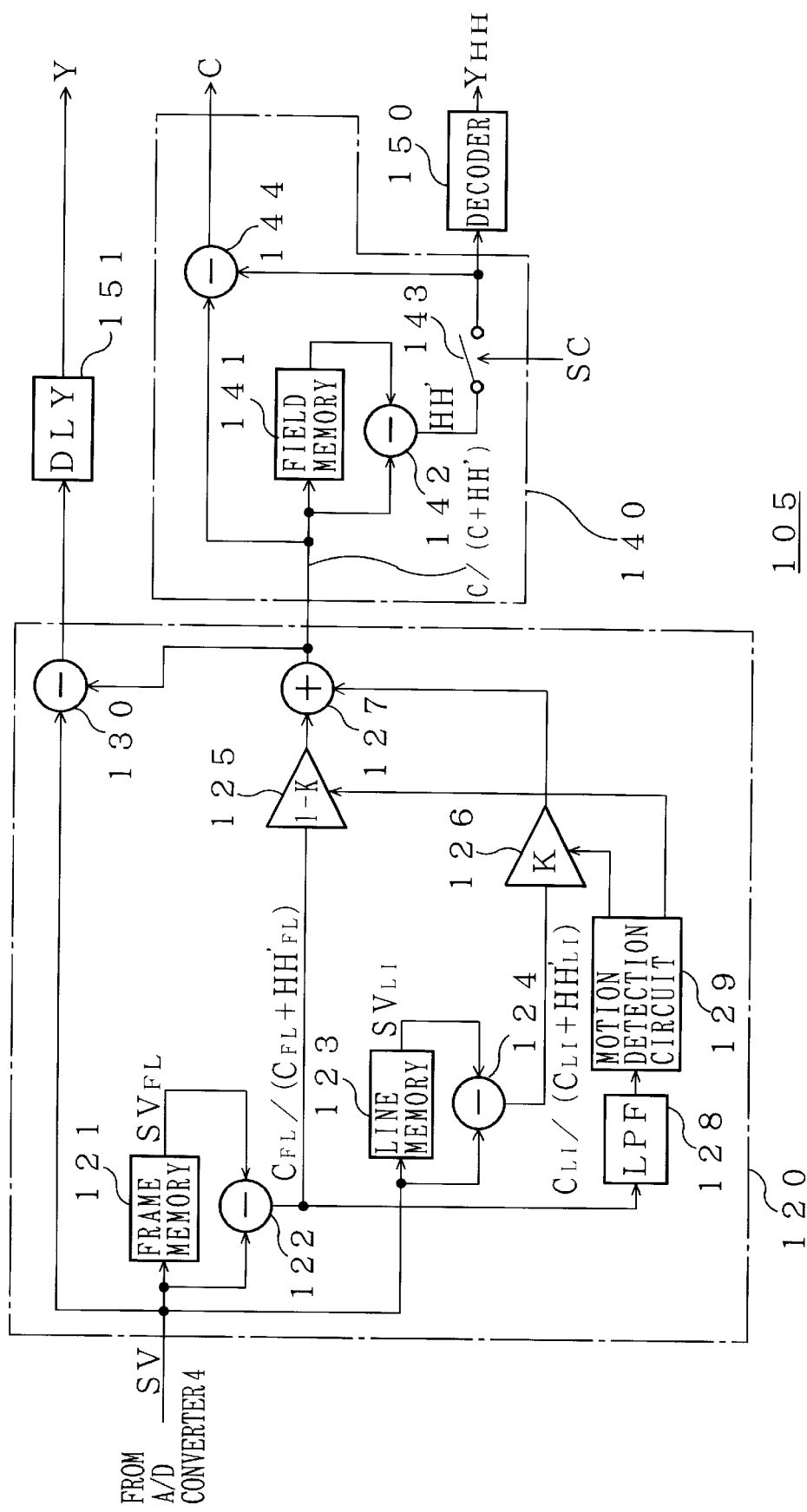

SIGNAL SEPARATOR AND TELEVISION RECEIVER HAVING THE SAME

BACKGROUND OF THE INVENTION

1. Field of the Invention

The present invention relates to a signal separator and a television receiver having it. More specifically, the present invention relates to a signal separator wherein a frame memory used as a three-dimensional comb filter upon NTSC broadcasting is used by being divided into a three-dimensional comb filter and a section for separation of a carrier chrominance signal and a horizontal resolution supplementary signal upon EDTV2 (second-generation EDTV) broadcasting, thereby making it possible to use the capacity of the memory without waste and integrate a system into compact form, and to a television receiver having the signal separator.

2. Description of the Related Art

A second-generation EDTV (extended definition television) has been proposed as a television broadcast system. The second-generation EDTV (hereinafter called "EDTV2") is intended to transmit a video signal having a wide aspect ratio, which has been photographed by a 16:9 high image-quality sequential scanning camera for EDTV2 at a broadcast station, to individual households over normal waves as used for ground waves and reproduce images subjected to the 16:9 high image-quality sequential scanning in the households as they are.

In an EDTV2 system, a so-called Letter-box transmission system has been adopted in which non-image or figure portions (black zones or areas) are provided above and below a 4:3 screen to transmit an image having a ratio of 16:9 in order to realize compatibility with the currently-used NTSC system. In this type of EDTV2 system, an image having a ratio of 16:9 is placed in a central portion of a 4:3 screen as a main figure portion and non-figure portions are set to positions above and below the screen. In the NTSC system, the number of scanning lines is 525 but the number of effective scanning lines, which appear on the screen, is normally about 480. Since the NTSC system is interlaced-scanned, the number of effective scanning lines per field reaches 240 corresponding to half of 480 scanning lines. Thus, in the EDTV2 system, the main figure portion is constructed of 180 scanning lines per field, whereas the non-figure portions are respectively constructed of 30 scanning lines at their above and below position.

In the EDTV2 system as well, a transmitted image with non-figure portions placed in above and below positions is scaled up by 33% in the vertical and horizontal directions so as to be displayed on the full screen of 16:9. Thus, since the image extending in the left and right directions is displayed in a state of being scaled up by 33% as compared with a conventional image, resolution appears scaled down as compared with the currently-used NTSC system if this condition is held as it is. Therefore, the EDTV2 system compensates for the reduction in resolution to ensure high image quality using a camera having a video frequency band wider than that employed in the currently-used NTSC system. The video frequency band of the camera is 4.2 MHz as used for the currently-used NTSC, whereas it is scaled up to 6 MHz as used for EDTV2.

Since, however, the transmission of the video frequency band is limited up to 4.2 MHx in the currently-used ground-wave broadcast, a frequency component (horizontal luminance high-frequency component) corresponding to a high-frequency range of 4.2 HMz to 6 MHz is frequency-converted into a low frequency component as shown in FIG. 23 and the converted frequency component is transmitted to the main figure portion of 16:9 in a frequency-multiplexed form as a horizontal resolution supplementary signal HH'. When the low frequency component is sent to the main figure portion on a frequency-multiplex basis, it is multiplexed into a luminance signal Y in a manner similar to the conventional carrier chrominance signal C. Since, however, a clearance in a three-dimensional space called a so-called hole, which has not heretofore been used, is used, the above frequency component does not blend with the carrier chrominance signal C. Incidentally, the separation of the horizontal resolution supplementary signal HH' from a video signal is carried out using, for example, a three-dimensional comb filter in the same manner as when the carrier chrominance signal C is separated from the video signal.

FIG. 24 shows an example of a configuration of a television receiver which corresponds to an EDTV2 broadcast as well as to an NTSC broadcast.

The television receiver illustrated in FIG. 24 has a tuner 102, a video detection circuit 103 and an A/D converter 104. The tuner 102 is supplied with a television broadcast signal received by an antenna 101. The tuner 102 performs a selection process for obtaining an intermediate frequency signal from a desired television broadcast signal and a process for amplifying the obtained intermediate frequency signal. The video detection circuit 103 is supplied with the intermediate frequency signal outputted from the tuner 102 and performs a detection process such as a synchronous detection or the like to extract a video signal SV. The A/D converter 104 is supplied with the video signal SV extracted from the video detection circuit 103 and converts the video signal SV into a digital signal. For example, a sampling frequency is 14.3 MHz (4 fsc) and is quantized in 8 bits per sample. Incidentally, symbol fsc indicates a color or chrominance subcarrier frequency which is 3.58 MHz.

Further, the television receiver shown in FIG. 24 has a signal separation circuit 105 and a receive signal discrimination circuit 106. The signal separation circuit 105 and the receive signal discrimination circuit 106 are respectively supplied with the video signal SV converted into the digital signal by the A/D converter 104. The receive signal discrimination circuit 106 judges or discriminates, based on an identification control signal inserted into a predetermined line (22H, 285H) of an interval for the video signal SV, whether the video signal SV depends on or is derived from the NTSC broadcast or EDTV2 broadcast. If it is judged that the video signal SV is derived from the EDTV2 broadcast, for example, then the receive signal discrimination circuit 106 outputs a decision or criterion signal SC for bringing the video signal SV to a high level "H". On the other hand, if it is judged that the video signal SV is derived from the NTSC broadcast, the receive signal discrimination circuit 106 outputs a decision or criterion signal SC for bringing the video signal SV to a low level "L". The criterion signal SC is supplied to the signal separation circuit 105.

The signal separation circuit 105 performs a signal separating process based on the criterion signal SC supplied from the receive signal discrimination circuit 106. Namely, when the video signal SV is found to result from the NTSC broadcast, the signal separation circuit 105 separates the video signal SV into a luminance signal Y and a carrier chrominance signal C. On the other hand, when the video signal SV results from the EDTV2 broadcast, the signal separation circuit 105 separates the video signal SV into a luminance signal Y, a carrier chrominance signal C and a horizontal resolution supplementary signal HH' and effects a decode process (carrier suppression and amplitude demodulating process) on the horizontal resolution supplementary signal HH' so as to obtain a horizontal luminance high-frequency component $Y_{HH}$.

Further, the television receiver shown in FIG. 24 includes an adder 107, a chrominance demodulation circuit 108, a matrix circuit 109, a D/A converter 110 and a video output circuit 111. When the video signal SV is found to result from the NTSC broadcast, the luminance signal Y outputted from the signal separation circuit 105 is supplied to the matrix circuit 109 through the adder 107. On the other hand, when the video signal SV is found to be derived from the EDTV2 broadcast, the luminance signal Y and the horizontal luminance high-frequency component $Y_{HH}$ outputted from the signal separation circuit 105 are supplied to the adder 107 where they are added together. Thereafter, the so-added luminance signal $(Y+Y_{HH})$ is supplied to the matrix circuit 109.

The chrominance demodulation circuit 108 is supplied with the carrier chrominance signal C outputted from the signal separation circuit 105 and effects a demodulation process at a R-Y axis and a B-Y axis to thereby obtain a red color-difference signal R-Y and a blue color-difference signal B-Y. The matrix circuit 109 is supplied with the luminance signal Y or added luminance signal $(Y+Y_{HH})$ and the color-difference signals R-Y and B-Y outputted from the chrominance demodulation circuit 108. Further, the matrix circuit 109 effects a matrix process on these luminance signals and color-difference signals to obtain red, green and blue signals R, G and B. The D/A converter 110 is supplied with the color signals R, G and B outputted from the matrix circuit 109 and converts them into analog signals. The video output circuit 111 is supplied with the color signals R, G and B converted into the analog signals by the D/A converter 110 and supplies the color signals R, G and B amplified by the video output circuit 111 to a color picture tube 112.

In the above construction, the criterion signal SC outputted from the receive signal discrimination circuit 106 is brought to the low level "L" when the video signal SV resultant from the NTSC broadcast is obtained from the video detection circuit 103. Therefore, the signal separation circuit 105 separates the video signal SV into the luminance signal Y and the carrier chrominance signal C. Next, the color-difference signals R-Y and B-Y demodulated by the chrominance demodulation circuit 108 based on the carrier chrominance signal C, and the luminance signal Y are supplied to the matrix circuit 109 from which the color signals R, G and B are obtained. Thereafter, a color image based on the color signals R, G and B, consequently, an image for NTSC broadcasting is displayed on the color picture tube 112.

Further, since the criterion signal SC outputted from the receive signal discrimination circuit 106 is brought to the high level "H" when the video signal SV derived from the EDTV2 broadcast is obtained from the video detection circuit 103, the signal separation circuit 105 separates the video signal SV into the luminance signal Y, the carrier chrominance signal C and the horizontal resolution supplementary signal HH' and demodulates the horizontal resolution supplementary signal HH' to obtain the horizontal luminance high-frequency component $Y_{HH}$. Next, the color-difference signals R-Y and B-Y demodulated by the chrominance demodulation circuit 108 based on the carrier chrominance signal C, and the added luminance signal $(Y+Y_{HH})$ outputted from the adder 107 are supplied to the matrix circuit 109 from which the color signals R, G and B are obtained. Thereafter, a color image based on the color signals R, G and B, consequently, an image for EDTV2 broadcasting is displayed on the color picture tube 112.

FIG. 25 shows an example of a configuration of the signal separation circuit 105. The signal separation circuit 105 shown in FIG. 25 comprises a signal processing circuit 120 for separating a luminance signal Y and a carrier chrominance signal C from a video signal SV or separating a luminance signal Y and a signal produced by combining a carrier chrominance signal C with a horizontal resolution supplementary signal HH' from a video signal SV, a signal processing circuit 140 for separating the carrier chrominance signal C and the horizontal resolution supplementary signal HH' from the signal produced by combining the carrier chrominance signal C with the horizontal resolution supplementary signal HH', a decoder 150 for demodulating the horizontal resolution supplementary signal HH' to thereby obtain a horizontal luminance high-frequency component $Y_{HH}$, and a delay circuit 151 for adjusting a time lag of the luminance signal Y from the carrier chrominance signal C or the horizontal resolution supplementary signal HH'.

The video signal SV corresponding to 8-bit data, which is outputted from the A/D converter 104, is supplied to a frame memory 121 and a subtracter 122 which constitute a C-type three-dimensional comb filter. A video signal $SV_{FL}$ delayed by one frame period, which is outputted from the frame memory 121, is supplied to a subtracter 122. Further, the video signal SV supplied from the A/D converter 104 is supplied to a line memory 123 and a subtracter 124 which constitute a C-type two-dimensional comb filter. A video signal $SV_{LI}$ delayed by one horizontal period, which is outputted from the line memory 123, is supplied to the subtracter 124. Counters 125 and 126 respectively multiply data outputted from the subtracters 122 and 124 by coefficients (1−K) and K and supply the multiplied data to an adder 127 where they are added together.

Further, the data outputted from the subtracter 122 is supplied to a low-pass filter 128 where a low-frequency component is extracted as a motion component, which is in turn supplied to a motion detection circuit 129. The motion detection circuit 129 sets the aforementioned coefficients (1−K) and K based on the motion component. Here, K varies in a range of 0 to 1 and increases as the motion greatly varies. Furthermore, the video signal SV corresponding to the 8-bit data which is outputted from the A/D converter 104, is supplied to a subtracter 130 and the output data of the adder 127 is supplied to the subtracter 130. Further, data outputted from the subtracter 130 is outputted through a delay circuit 151.

In addition, the output data of the adder 127 is supplied to a field memory 141 and a subtracter 142 which constitute a three-dimensional comb filter. Data delayed by one field period, which is outputted from the field memory 141, is supplied to the subtracter 142. Data outputted from the subtracter 142 is supplied to the decoder 150 through a connecting switch 143. Further, the output data of the adder 127 is supplied to a subtracter 144, which is in turn supplied with the output data of the subtracter 142 through the connecting switch 143. The criterion signal SC outputted from the receive signal discrimination circuit 106 is supplied to the connecting switch 143 as an on-off control signal. When the video signal SV is derived from the NTSC broadcast in this case, the connecting switch 143 is turned OFF. On the other hand, when the video signal SV is derived from the EDTV2 broadcast, the connecting switch 143 is turned ON.

When the video signal SV is derived from the NTSC broadcast under the above construction, a carrier chrominance signal $C_{FL}$ subjected to a frame-to-frame process is obtained from the subtracter 122 of the signal processing circuit 120 and a carrier chrominance signal $C_{LI}$ subjected to a line-to-line process is obtained from the subtracter 124. Therefore, a carrier chrominance signal C obtained by adding the carrier chrominance signal $C_{FL}$ subjected to the frame-to-frame process and the carrier chrominance signal $C_{LI}$ subjected to the line-to-line process together according to a motion-dependent ratio is obtained as the output signal of the adder 127. Since the connecting switch 143 is in an OFF state in this case, the carrier chrominance signal C outputted from the adder 127 becomes data outputted from the signal separation circuit 105 through the subtracter 144 as it is.

The carrier chrominance signal C outputted from the adder 127 is supplied to the subtracter 130 of the signal processing circuit 120 where it is subtracted from the video signal SV. Therefore, a luminance signal Y is obtained from the subtracter 130 and the obtained luminance signal Y is timed by the delay circuit 151 after which it becomes data outputted from the signal separation circuit 105.

On the other hand, when the video signal SV is derived from the EDTV2 broadcast, a signal ($C_{FL}$+HH'$_{FL}$) produced by combining together a carrier chrominance signal $C_{FL}$ and a horizontal resolution supplementary signal HH'$_{FL}$ subjected to a frame-to-frame process is obtained from the subtracter 122 of the signal processing circuit 120. Further, a signal ($C_{LI}$+HH'$_{LI}$) produced by combining a carrier chrominance signal $C_{LI}$ and a horizontal resolution supplementary signal HH'$_{LI}$ subjected to a line-to-line process can be produced from the subtracter 124. Therefore, a composite signal (C+HH') obtained by adding the combined signal ($C_{FL}$+HH'$_{FL}$) subjected to the frame-to-frame process and the combined signal ($C_{LI}$+HH'$_{LI}$) subjected to the line-to-line process according to a motion-dependent ratio is obtained as the output data of the adder 127. Further, a horizontal resolution supplementary signal HH' is obtained from the subtracter 142 of the signal processing circuit 140 in accordance with a field-to-field process.

Since the connecting switch 143 is ON in this case, the horizontal resolution supplementary signal HH' outputted from the subtracter 142 is supplied via the connecting switch 143 to the decoder 150 from which a horizontal luminance high-frequency component $Y_{HH}$ is obtained. The resultant horizontal luminance high-frequency component $Y_{HH}$ is used as the output data of the signal separation circuit 105.

Since the connecting switch 143 is in the ON state, the horizontal resolution supplementary signal HH' outputted from the subtracter 142 is supplied via the connecting switch 143 to the subtracter 144 of the signal processing circuit 140, where it is subtracted from the composite signal (C+HH') outputted from the adder 127 of the signal processing circuit 120. Therefore, a carrier chrominance signal C is obtained from the subtracter 144, which becomes data outputted from the signal separation circuit 105.

Further the composite signal (C+HH') outputted from the adder 127 is supplied to the subtracter 130 of the signal processing circuit 120, where it is subtracted from the video signal SV. Therefore, a luminance signal Y is obtained from the subtracter 130. The resultant luminance signal Y is timed by the delay circuit 151 after which it is produced as the output data of the signal separation circuit 105.

In the signal processing circuit 120 of the signal separation circuit 105 illustrated in FIG. 25, a three-dimensional comb filter is constructed using the frame memory 121. In the signal processing circuit 140, a three-dimensional comb filter is constructed using the field memory 141. Since, however, the three-dimensional comb filter constructed by the use of the field memory 141 is used only upon EDTV2 broadcasting, the field memory 141 becomes useless upon NTSC broadcasting. Since the signal processing circuit 120 includes the frame memory 121 and the signal processing circuit 140 has the field memory 141, waste increases in terms of the circuit.

OBJECT AND SUMMARY OF THE INVENTION

It is therefore an object of the present invention to provide a signal separator capable of efficiently using memories and integrating a system into compact form and a television receiver having the signal separator.

The present invention provides a signal separator for separating a luminance signal and a carrier chrominance signal from a first video signal produced by combining the luminance signal with the carrier chrominance signal and separating a luminance signal, a carrier chrominance signal and a horizontal resolution supplementary signal from a second video signal produced by combining the luminance signal, the carrier chrominance signal and the horizontal resolution supplementary signal together, which comprises:

a first signal separation section for separating the luminance signal and the carrier chrominance signal from the first video signal using first and second memories;

a second signal separation section for separating the luminance signal and the signal produced by combining the carrier chrominance signal with the horizontal resolution supplementary signal from the second video signal using the first memory; and a third signal separation section for separating the carrier chrominance signal and the horizontal resolution supplementary signal from the combined signal using the second memory.

Further, the present invention provides a television receiver capable of receiving therein a first video signal produced by combining a luminance signal with a carrier chrominance signal and a second video signal produced by combining a luminance signal, a carrier chrominance signal and a horizontal resolution supplementary signal together, comprising:

a first signal separation section for separating the luminance signal and the carrier chrominance signal from the first video signal using first and second memories;

a second signal separation section for separating the luminance signal and the signal produced by combining the carrier chrominance signal with the horizontal resolution supplementary signal from the second video signal using the first memory; and a third signal separation section for separating the carrier chrominance signal and the horizontal resolution supplementary signal from the combined signal using the second memory;

whereby upon receipt of the first video signal, the luminance signal and the carrier chrominance signal are separated from the first video signal by the first signal separation section; and upon receipt of the second video signal, the luminance signal and the signal produced by combining the carrier chrominance signal with the horizontal resolution supplementary signal are separated from the second video signal by the second signal separation section, and the carrier chrominance signal and the horizontal resolution supplementary signal are separated from the combined signal by the third signal separation section.

In regard to the first video signal obtained by combining the luminance signal with the carrier chrominance signal, the first and second memories are used to constitute the first signal separation section. The luminance signal and the carrier chrominance signal are separated from the first video signal by the first signal separation section.

In regard to the second video signal produced by combining the luminance signal, the carrier chrominance signal and the horizontal resolution supplementary signal together, the first memory is used to constitute the second signal separation section. The luminance signal and the composite signal composed of carrier chrominance signal and horizontal resolution supplementary signal are separated from the second video signal by the second signal separation section. Further, the second memory is used to configure the third signal separation section. The carrier chrominance signal and horizontal resolution supplementary signal are separated from the composite signal by the third signal separation section.

Other objects, features and advantages of the present invention will become apparent in the following specification and accompanying drawings.

BRIEF DESCRIPTION OF THE DRAWINGS

FIGS. 4A–4Q is a timing chart for describing the operation of the bit converter (8→12);

FIGS. 6A–6N is a timing chart for describing the operation of the bit converter (12→8);

FIG. 8 including FIGS. 8A–8I is a timing chart for describing the operation of the bit converter (8→4);

FIG. 10 including FIGS. 10A–10F is a timing chart for describing the operation of the bit converter (4→8);

FIG. 11 including

FIGS. 14A–14L is a timing chart for describing the operations of the bit converter (8→4) and the peripheral circuit;

FIG. 16 including FIGS. 16A–16J is a timing chart for describing the operations of the bit converter (4→8) and the peripheral circuit thereof;

FIG. 24 is a block diagram showing a configuration of a television receiver corresponding to NTSC and EDTV2 broadcasts; and FIG. 25 is a block diagram illustrating a configurational example of a signal separation circuit.

DESCRIPTION OF THE PREFERRED EMBODIMENT

Figure 1:
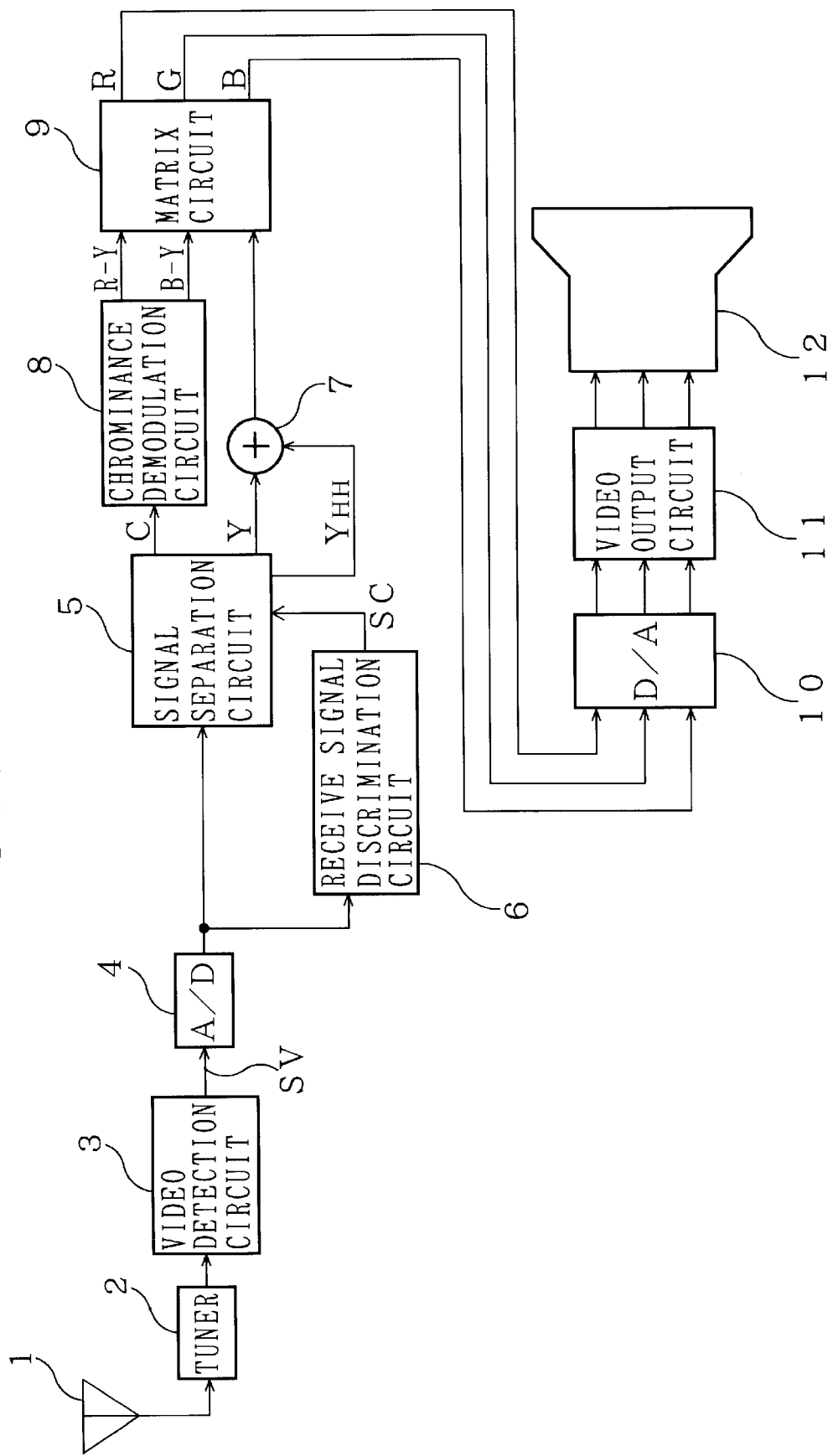
FIG. 1 is a block diagram showing a configuration of a television receiver illustrated as an embodiment of the present invention.

Embodiments of the present invention will hereinafter be described with reference to the accompanying drawings. FIG. 1 shows a configuration of a television receiver illustrated as an embodiment. The present television receiver corresponds to an EDTV2 broadcast as well as an NTSC broadcast.

The television receiver shown in FIG. 1 has a tuner 2, a video detection circuit 3 and an A/D converter 4. The tuner 2 is supplied wit a television broadcast signal received by an antenna 1. The tuner 2 performs a selection process for obtaining an intermediate frequency signal from a desired television broadcast signal and a process for amplifying the obtained intermediate frequency signal. The video detection circuit 3 is supplied with the intermediate frequency signal outputted from the tuner 2 and performs a detection process such as a synchronous detection or the like so as to extract a video signal SV. The A/D converter 4 is supplied with the video signal SV detected by the video detection circuit 3 and converts the detected video signal SV into a digital signal. In the present embodiment, a sampling frequency is 14.3 MHz (4 fsc) and is quantized in 8 bits per sample. Incidentally, symbol fsc indicates a color or chrominance subcarrier frequency which is 3.58 MHz.

Further, the television receiver shown in FIG. 1 has a signal separation circuit 5 and a receive signal discrimination circuit 6. The signal separation circuit 5 and the receive signal discrimination circuit 6 are respectively supplied with the video signal SV converted into the digital signal by the A/D converter 4. The receive signal discrimination circuit 6 judges or discriminates, based on an identification control signal inserted into a predetermined line (22H, 285H) of an interval for the video signal SV, whether the video signal SV depends on the NTSC broadcast or EDTV2 broadcast. If it is judged that the video signal SV depends on the EDTV2 broadcast, for example, the receive signal discrimination circuit 6 outputs a decision or criterion signal SC for bringing the video signal SV to a high level "H". On the other hand, if it is judged that the video signal SV depends on the NTSC broadcast, the receive signal discrimination circuit 6 outputs a decision or criterion signal SC for bringing the video signal SV to a low level "L". The criterion signal SC is supplied to the signal separation circuit 5.

The signal separation circuit 5 performs a signal separating process based on the criterion signal SC supplied from the receive signal discrimination circuit 6. Namely, when the video signal SV is found to result from the NTSC broadcast, the signal separation circuit 5 separates the video signal SV into a luminance signal Y and a carrier chrominance signal C. On the other hand, when the video signal SV results from the EDTV2 broadcast, the signal separation circuit 5 separates the video signal SV into a luminance signal Y, a carrier chrominance signal C and a horizontal resolution supplementary signal HH' and effects a decode process (carrier suppression and amplitude demodulating process) on the horizontal resolution supplementary signal HH' so as to obtain a horizontal luminance high-frequency component $Y_{HH}$.

Further, the television receiver shown in FIG. 1 includes an adder 7, a chrominance demodulation circuit 8, a matrix circuit 9, a D/A converter 10 and a video output circuit 11. When the video signal SV is found to result from the NTSC broadcast, the luminance signal Y outputted from the signal separation circuit 5 is supplied to the matrix circuit 9 through the adder 7. On the other hand, when the video signal SV is found to be derived from the EDTV2 broadcast, the luminance signal Y and the horizontal luminance high-frequency component $Y_{HH}$ outputted from the signal separation circuit 5 are supplied to the adder 7 where they are added together. Thereafter, the so-added luminance signal $(Y+Y_{HH})$ is supplied to the matrix circuit 9.

The chrominance demodulation circuit 8 is supplied with the carrier chrominance signal C outputted from the signal separation circuit 5 and effects a demodulation process at a R-Y axis and a B-Y axis to thereby obtain a red color-difference signal R-Y and a blue color-difference signal B-Y. The matrix circuit 9 is supplied with the luminance signal Y or added luminance signal $(Y+Y_{HH})$ and the color-difference signals R-Y and B-Y outputted from the chrominance demodulation circuit 8. Further, the matrix circuit 9 effects a matrix process on these luminance signals and color-difference signals to obtain red, green and blue signals R, G and B. The D/A converter 10 is supplied with the color signals R, G and B outputted from the matrix circuit 9 and converts them into analog signals. The video output circuit 11 is supplied with the color signals R, G and B converted into the analog signals by the D/A converter 10 and supplies the color signals R, G and B amplified thereat to a color picture tube 12.

In the above construction, the criterion signal SC outputted from the receive signal discrimination circuit 6 is brought to the low level "L" when the video signal SV resultant from the NTSC broadcast is obtained from the video detection circuit 3. Therefore, the signal separation circuit 5 separates the video signal SV into the luminance signal Y and the carrier chrominance signal C. Next, the color-difference signals R-Y and B-Y demodulated by the chrominance demodulation circuit 8 based on the carrier chrominance signal C, and the luminance signal Y are supplied to the matrix circuit 9 from which the color signals R, G and B are obtained. Thereafter, a color image based on the color signals R, G and B, consequently, an image for EDTV2 broadcasting is displayed on the color picture tube 12.

Further, since the criterion signal SC outputted from the receive signal discrimination circuit 6 is brought to the high level "H" when the video signal SV derived from the EDTV2 broadcast is obtained from the video detection circuit 3, the signal separation circuit 5 separates the video signal SV into the luminance signal Y, the carrier chrominance signal C and the horizontal resolution supplementary signal HH' and demodulates the horizontal resolution supplementary signal HH' to obtain the horizontal luminance high-frequency component $Y_{HH}$. Next, the color-difference signals R-Y and B-Y demodulated by the chrominance demodulation circuit 8 based on the carrier chrominance signal C, and the added luminance signal $(Y+Y_{HH})$ outputted from the adder 7 are supplied to the matrix circuit 9 from which the color signals R, G and B are obtained. Thereafter, a color image based on the color signals R, G and B, consequently, an image for EDTV2 broadcasting is displayed on the color picture tube 12.

Figure 2:
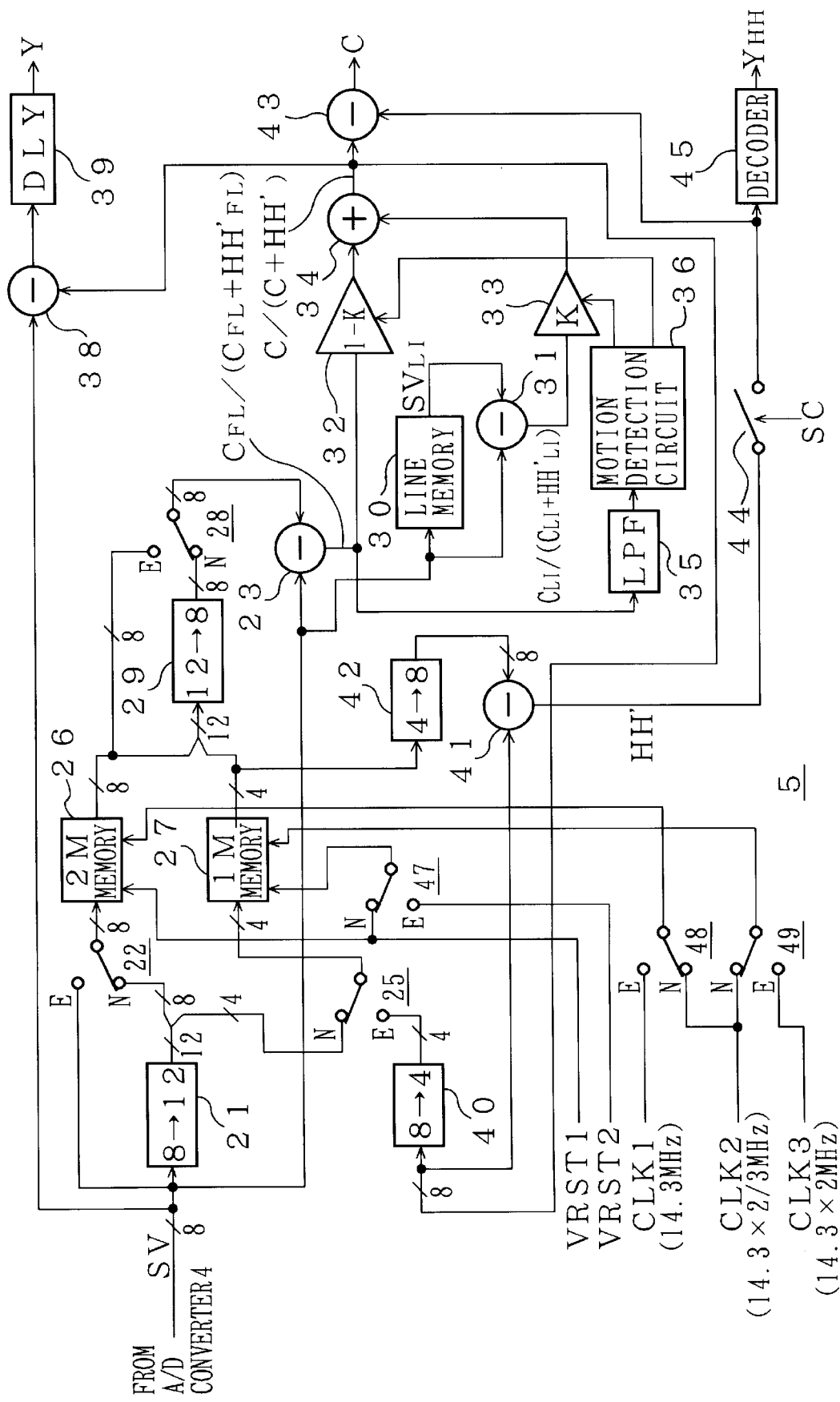
FIG. 2 is a block diagram illustrating a configuration of a signal separation circuit.

FIG. 2 shows the configuration of the signal separation circuit 5. In the drawing, the video signal SV indicative of 8-bit data outputted from the A/D converter 4 is supplied to a bit converter 21, a fixed terminal on the E side of a changeover switch 22 and a subtracter 23. The bit converter 21 is used to convert the 8-bit data into 12-bit data. The eight leftmost bits of the output data (12-bit data) of the bit converter 21 are supplied to a fixed terminal on the N side of the changeover switch 22 and the rightmost 4-bits thereof are supplied to a fixed terminal on the N side of a changeover switch 25. The output data (8-bit data) of the changeover switch 22 is supplied to a 2M-bit memory (video RAM) 26 used as a first memory as write data. The output data (4-bit data) of the changeover switch 25 is supplied to a 1M-bit memory (video RAM) 27 used as a second memory as write data.

The data (8-bit data) read from the memory 26 is supplied to a fixed terminal on the E side of a changeover switch 28. Synthesized data (12-bit data) in which the data (8-bit data) read from the memory 26 is defined as an upper bit and the data (4-bit data) read from the memory 27 is defined as a lower bit, is supplied to a bit converter 29. The bit converter 29 is used to convert the 12-bit data into the 8-bit data. Data (8-bit data) outputted from the bit converter 29 is supplied to a fixed terminal on the N side of the changeover switch 28. The output data (8-bit data) of the changeover switch 28 is supplied to the subtracter 23.

Further, the video signal SV corresponding to the 8-bit data, which is outputted from the A/D converter 4, is supplied to a line memory 30 and a subtracter 31, which constitute a C-type two-dimensional comb filter. A video signal $SV_{LI}$ delayed by one horizontal period, which is outputted from the line memory 30, is supplied to the subtracter 31. Counters 32 and 33 respectively multiply data outputted from the subtracters 23 and 31 by coefficients (1−K) and K and supply the multiplied data to an adder 34 where they are added together. Further, the data outputted from the subtracter 23 is supplied to a low-pass filter 35 where a low-frequency component is extracted as a motion component, which is in turn supplied to a motion detection circuit 36. The motion detection circuit 36 sets the aforementioned coefficients (1−K) and K based on the motion component. Here, K varies in a range of 0 to 1 and increases as the motion greatly varies.

Furthermore, the video signal SV corresponding to the 8-bit data, which is outputted from the A/D converter 4, is supplied to a subtracter 38 and the output data of the adder 34 is supplied to the subtracter 38. Further, data outputted from the subtracter 38 is outputted from the signal separation circuit 5 through a delay circuit 39. The delay circuit 39 is used to adjust a time lag of the luminance signal Y from the carrier chrominance signal C or the horizontal resolution supplementary signal HH'.

Further, the output data of the adder 34 is supplied to a bit converter 40 and a subtracter 41. The bit converter 40 is used to convert 8-bit data into 4-bit data. The output data (4-bit data) of the bit converter 40 is supplied to the fixed terminal on the E side of the changeover switch 25. In addition, the data (4-bit data) read from the memory 27 is supplied to a bit converter 42. The bit converter 42 is used to convert the 4-bit data into the 8-bit data. The output data (8-bit data) of the bit converter 42 is supplied to a subtracter 41.

Furthermore, the output data of the adder 34 is supplied to a subtracter 43. Data outputted from the subtracter 41 is supplied to a subtracter 43 through a connecting switch 44. Data outputted from the subtracter 43 is used as the output of the signal separation circuit 5. The criterion signal SC outputted from the receive signal discrimination circuit 6 is supplied to the connecting switch 44 as an on-off control signal. In this case, the connecting switch 44 is turned OFF when the video signal SV is derived from the NTSC broadcast. On the other hand, when the video signal SV is derived from the EDTV2 broadcast, the connecting switch 44 is turned ON.

The output data of the subtracter 41 is supplied to a decoder 45 through the connecting switch 44. The decoder 45 is used to demodulate the horizontal resolution supplementary signal HH' so as to obtain the horizontal luminance high-frequency component $Y_{HH'}$. The output data of the decoder 45 is used as the output of the signal separation circuit 5.

A reset signal VRST1 generated in timing at the start of each frame is supplied to the aforementioned memory 26 so as to reset a write address and a read address. Further, the reset signal VRST1 is supplied to a fixed terminal on the N side of a changeover switch 47. A reset signal VRST2 generated in timing at the start of each field is supplied to a fixed terminal on the E side of the changeover switch 47. The signal outputted from the changeover switch 47 is supplied to the memory 27.

When the changeover switch 47 is now controlled by switching based on the criterion signal SC (no control line is shown in the drawing) and the video signal SV is derived from the NTSC broadcast, the changeover switch 47 is electrically connected to the N side. On the other hand, when the video signal SV is derived from the EDTV2 broadcast, the changeover switch 47 is electrically connected to the E side. Thus, when the video signal SV is derived from the NTSC broadcast, the reset signal VRST1 is supplied to the memory 27 so that the write and addresses are reset for each frame. When the video signal SV is derived from the EDTV2 broadcast, the reset signal VRST2 is supplied to the memory 27 so that the write and read addresses are reset for each field.

Incidentally, each of the aforementioned changeover switches 22, 25 and 28 is also controlled by switching based on the criterion signal SC in a manner similar to the connecting switch 47. When the video signal SV is derived from the NTSC broadcast in this condition, each of the changeover switches 22, 25 and 28 is electrically connected to the N side. When the video signal SV is derived from the EDTV2, each of them is electrically connected to the E side.

A clock CLK1 of 14.3 MHz is supplied to a fixed terminal on the E side of a changeover switch 48. A fixed terminal on the N side of the changeover switch 48 is supplied with a clock CLK2 of 141.3×⅔ MHz. The signal outputted from the changeover switch 48 is supplied to the memory 26 as an operating clock. Further, the clock CLK2 is supplied to a fixed terminal on the N side of a changeover switch 49. A fixed terminal on the E side of the changeover switch 49 is supplied with a clock CLK3 of 14.3×2 MHz. The signal outputted from the changeover switch 49 is supplied to the memory 27 as an operating clock.

Here, each of the changeover switches 48 and 49 is controlled by switching based on the criterion signal SC in a manner similar to the aforementioned changeover switch 47. When the video signal SV is derived from the NTSC broadcast in this condition, the changeover switches 48 and 49 are respectively electrically connected to the N sides. On the other hand, when the video signal SV is derived from the EDTV2 broadcast, they are respectively electrically connected to the E sides. Thus, when the video signal SV is derived from the NTSC broadcast, the clock CLK2 is supplied to the memories 26 and 27 as the operating clock. On the other hand, when the video signal SV is derived from the EDTV2 broadcast, the clock CLK1 is supplied to the memory 26 as the operating clock and the clock CLK3 is supplied to the memory 27 as the operating clock.

Figure 3:
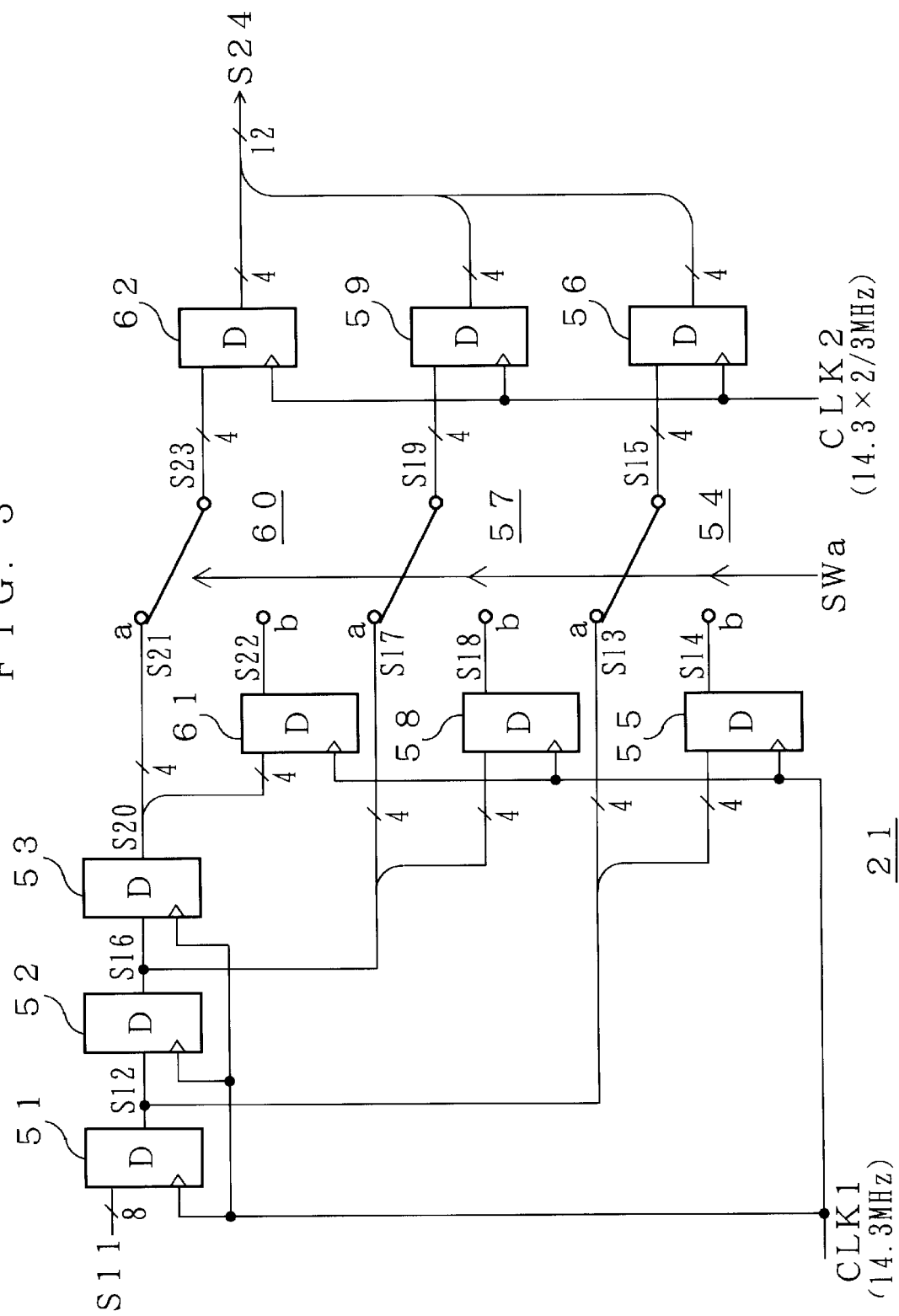
FIG. 3 is a connection diagram depicting a configuration of a bit converter (8→12)

FIG. 3 shows the configuration of the bit converter 21. In the drawing, input 8-bit data S11 (sampling frequency: 14.3 MHz) is supplied to a series circuit of latch circuits 51, 52 and 53 each composed of a D flip-flop. The leftmost 4-bit data S13 of 8-bit data S12 outputted from the latch circuit 51 is supplied to a fixed terminal on the a side of a changeover switch 54 which constitutes a selector, whereas the rightmost 4-bit data is supplied to a latch circuit 55 composed of a D flip-flop. Further, 4-bit data S14 outputted from the latch circuit 55 is supplied to a fixed terminal on the b side of the changeover switch 54. Thereafter, 4-bit data S15 outputted through the changeover switch 54 is supplied to a latch circuit 56 composed of a D flip-flop.

Further, the four leftmost bit data S17 of 8-bit data S16 outputted from the latch circuit 52 is supplied to a fixed terminal on the a side of a changeover switch 57 which constitutes a selector, and the rightmost 4-bit data is supplied to a latch circuit 58 composed of a D flip-flop. Further, 4-bit data S18 outputted from the latch circuit 58 is supplied to a fixed terminal on the b side of the changeover switch 57. Thereafter, 4-bit data S19 outputted from the changeover switch 57 is supplied to a latch circuit 59 composed of a D flip-flop.

The leftmost 4-bit data S21 of 8-bit data S20 outputted from the latch circuit 53 is supplied to a fixed terminal on the a side of a changeover switch 60 which constitutes a selector, and the rightmost 4-bit data is supplied to a latch circuit 61 composed of a D flip-flop. Further, 4-bit data S22 outputted from the latch circuit 61 is supplied to a fixed terminal on the b side of the changeover switch 60. Thereafter, 4-bit data S23 outputted through the changeover switch 60 is supplied to a latch circuit 62 composed of a D flip-flop.

The 4-bit data respectively outputted from the aforementioned latch circuits 56, 59 and 62 constitute output 12-bit data S24 (sampling frequency: 14.3×⅔ MHz). The 4-bit data respectively outputted from the latch circuits 62, 59 and 56 become the leftmost 4-bit data, midmost 4-bit data and rightmost 4-bit data of the output 12-bit data S24.

Further the latch circuits 51 through 53, 55, 58 and 61 are respectively supplied with a clock CLK1 (shown in FIG. 4A) of 14.3 MHz as a latch clock. The latch circuits 56, 59 and 62 are respectively supplied with a clock CLK2 (shown in FIG. 4B) of 14.3×⅔ MHz as a latch clock. Further, the changeover switches 54, 57 and 60 are respectively selectively switched to the a or b side in response to a switch control signal SWa (shown in FIG. 4C) synchronized with the clock CLK2.

When the input 8-bit data S11 is represented as shown in FIG. 4D under the above construction, the output data S12 of the latch circuit 51 is represented as shown in FIG. 4E.

Figure 4:
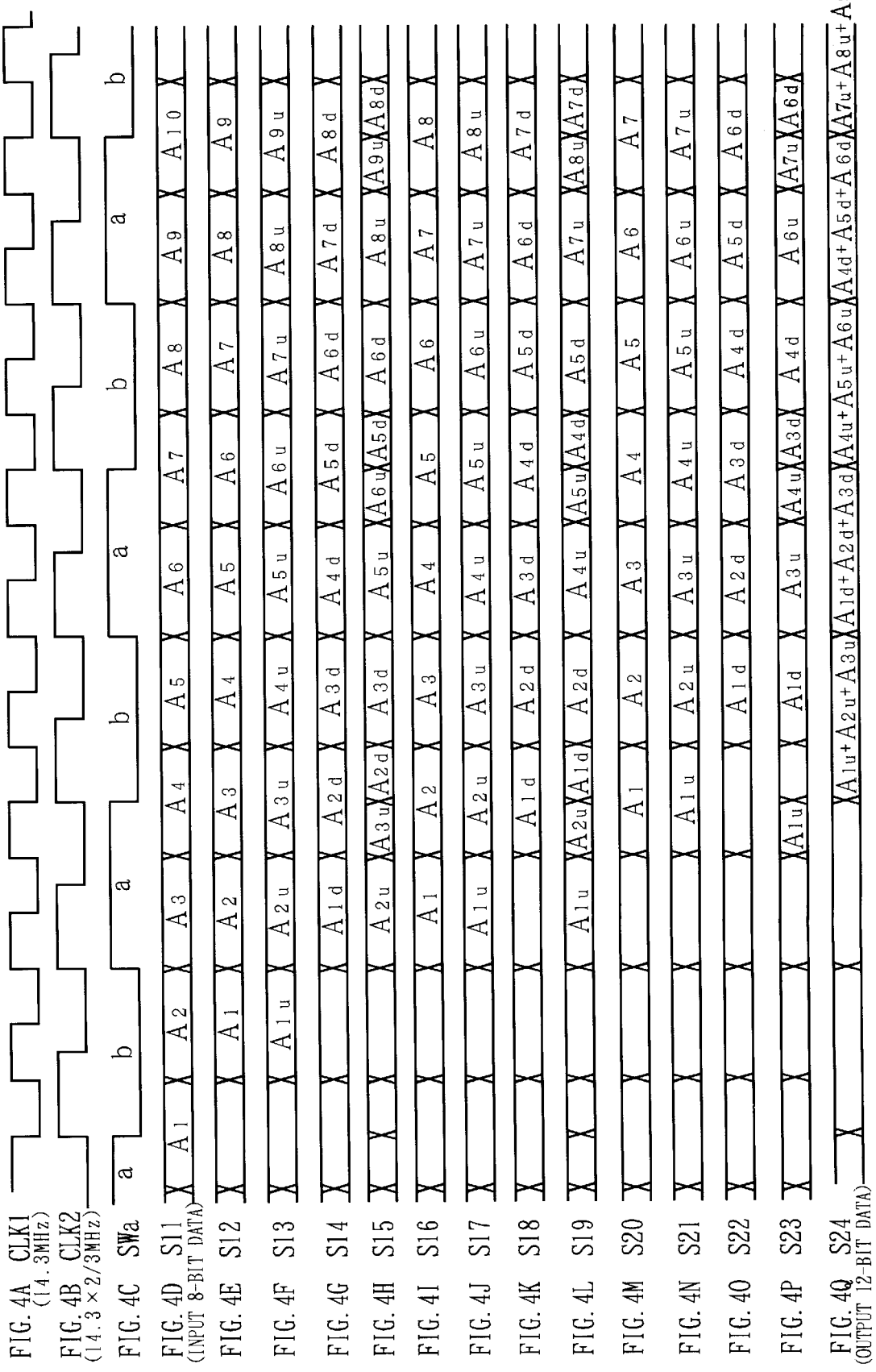
FIG. 4 including

Further, the fixed terminals on the a and b sides of the changeover switch 54 are respectively supplied with 4-bit data S13 and S14 shown in FIGS. 4F and 4G, and 4-bit data S14 shown in FIG. 4H is outputted from the changeover switch 54. In FIG. 4, the data added with "u" as represented as $A_{1u}$, $A_{2u}$, . . . , respectively show the leftmost 4-bit data of 8-bit data of $A_1$, $A_2$, . . . , and the data added with "d" as represented as $A_{1d}$, $A_{2d}$, . . . , respectively show the rightmost 4-bit data of the 8-bit data of $A_1$, $A_2$, . . .

Further, the output data S16 of the latch circuit 52 is represented as shown in FIG. 4I. The fixed terminals on the a and b sides of the changeover switch 57 are respectively supplied with 4-bit data S17 and S18 shown in FIGS. 4J and 4K, and 4-bit data S19 shown in FIG. 4L is outputted from the changeover switch 57. In addition, the output data S20 of the latch circuit 53 is represented as shown in FIG. 4M. The fixed terminals on the a and b sides of the changeover switch 60 are respectively supplied with 4-bit data S21 and S22 shown in FIGS. 4N and 4O, and 4-bit data S23 shown in FIG. 4P is outputted from the changeover switch 60. Thus, output 12-bit data S24 (sampling frequency: 14.3×⅔ MHz) shown in FIG. 4Q is obtained from the latch circuits 62, 59 and 56.

Figure 5:
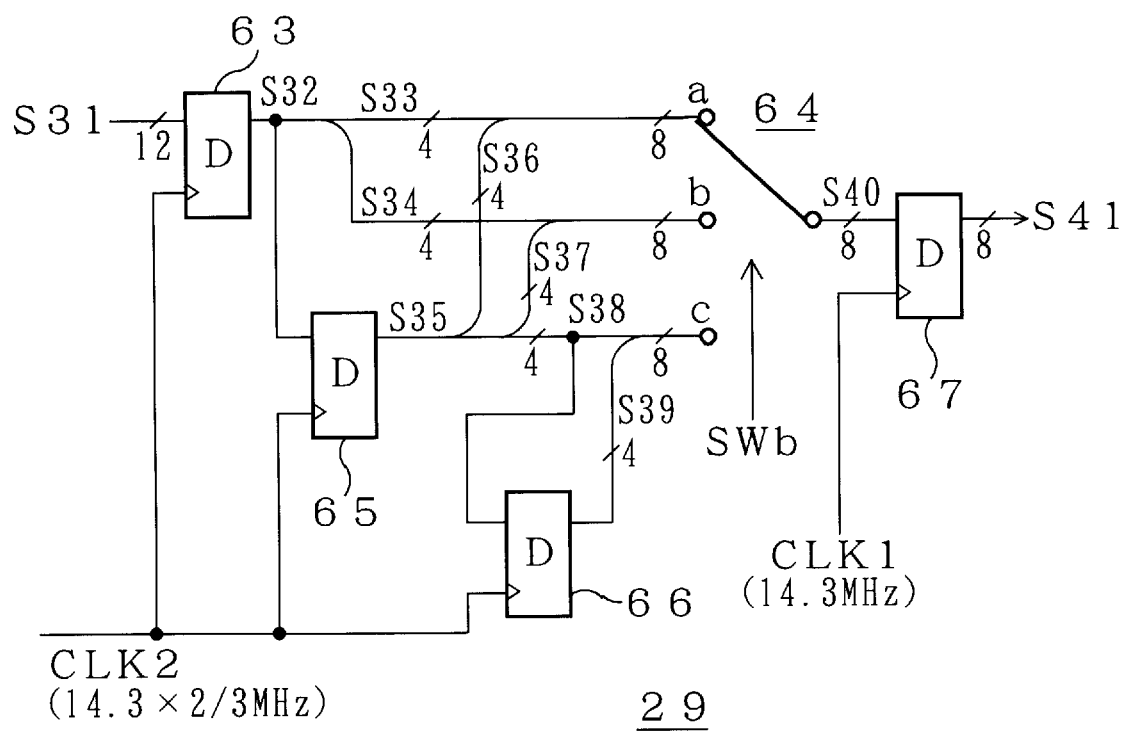
FIG. 5 is a connection diagram showing a configuration of a bit converter (12→8)

FIG. 5 illustrates the configuration of the bit converter 29. In the drawing, input 12-bit data S31 (sampling frequency: 14.3×⅔ MHz) is supplied to a latch circuit 63 composed of a D flip-flop. The leftmost 4-bit data S33 of 12-bit data S32 outputted from the latch circuit 63 is supplied to a fixed terminal on the a side of a changeover switch 64 which constitutes a selector, as the rightmost 4-bit data. Further, the midmost 4-bit data S34 thereof is supplied to a fixed terminal on the b side of the changeover switch 64 as the rightmost 4-bit data.

Further, the 12-bit data S32 outputted from the latch circuit 63 is supplied to a latch circuit 65 composed of a D flip-flop. The leftmost 4-bit data S36 of 12-bit data S35 outputted from the latch circuit 65 is supplied to the fixed terminal on the a side of the changeover switch 64 as the leftmost 4-bit data. Further, the midmost 4-bit data S37 thereof is supplied to the fixed terminal on the b side of the changeover switch 64 as the leftmost 4-bit data and the rightmost 4-bit data S38 thereof is supplied to a fixed terminal on the c side of the changeover switch 64 as the rightmost 4-bit data.

The rightmost 4-bit data S38 of the 12-bit data S35 outputted from the latch circuit 65 is supplied to a latch circuit 66 composed of a D flip-flop. 4-bit data S39 outputted from the latch circuit 66 is supplied to the fixed terminal on the c side of the changeover switch 64 as the leftmost 4-bit data. 8-bit data S40 outputted through the changeover switch 64 is supplied to a latch circuit 67 composed of a D flip-flop. Thereafter, output 8-bit data S41 (sampling frequency: 14.3 MHz) is outputted from the latch circuit 67.

The latch circuits 63, 65 and 66 are respectively supplied with a clock CLK2 (shown in FIG. 6B) of 14.3×⅔ MHz as a latch clock. The latch circuit 67 is supplied with a clock CLK1 (shown in FIG. 6A) of 14.3 MHz as a latch clock. The changeover switch 64 is selectively switched to the a, b or c side in response to a switch control signal SWb (shown in FIG. 6C) synchronized with the clock CLK1.

When the input 12-bit data S31 is represented as shown in FIG. 6D under the above construction, the output data S32 of the latch circuit 63 is represented as illustrated in FIG. 6E and the fixed terminals on the a and b sides of the changeover switch 64 are respectively supplied with 4-bit data S33 and S34 shown in FIGS. 6F and 6G as the rightmost 4-bit data. Further, the output data S35 of the latch circuit 65 is represented as shown in FIG. 6H. The fixed terminals on the a and b sides of the changeover switch 64 are respectively supplied with 4-bit data S36 and S37 shown in FIGS. 6I and 6J as the leftmost 4-bit data, and the fixed terminal on the c side of the changeover switch 64 is supplied with 4-bit data S38 shown in FIG. 6K as the rightmost 4-bit data.

The 4-bit data S39 outputted from the latch circuit 66 is represented as illustrated in FIG. 6L. The 4-bit data S39 is supplied to the fixed terminal on the c side of the changeover switch 64 as the leftmost 4-bit data. Further, the 8-bit data S40 outputted from the changeover switch 64 is represented as shown in FIG. 6M and hence 8-bit data S41 (sampling frequency: 14.3 MHz) shown in FIG. 6N is obtained from the latch circuit 67.

Figure 6:
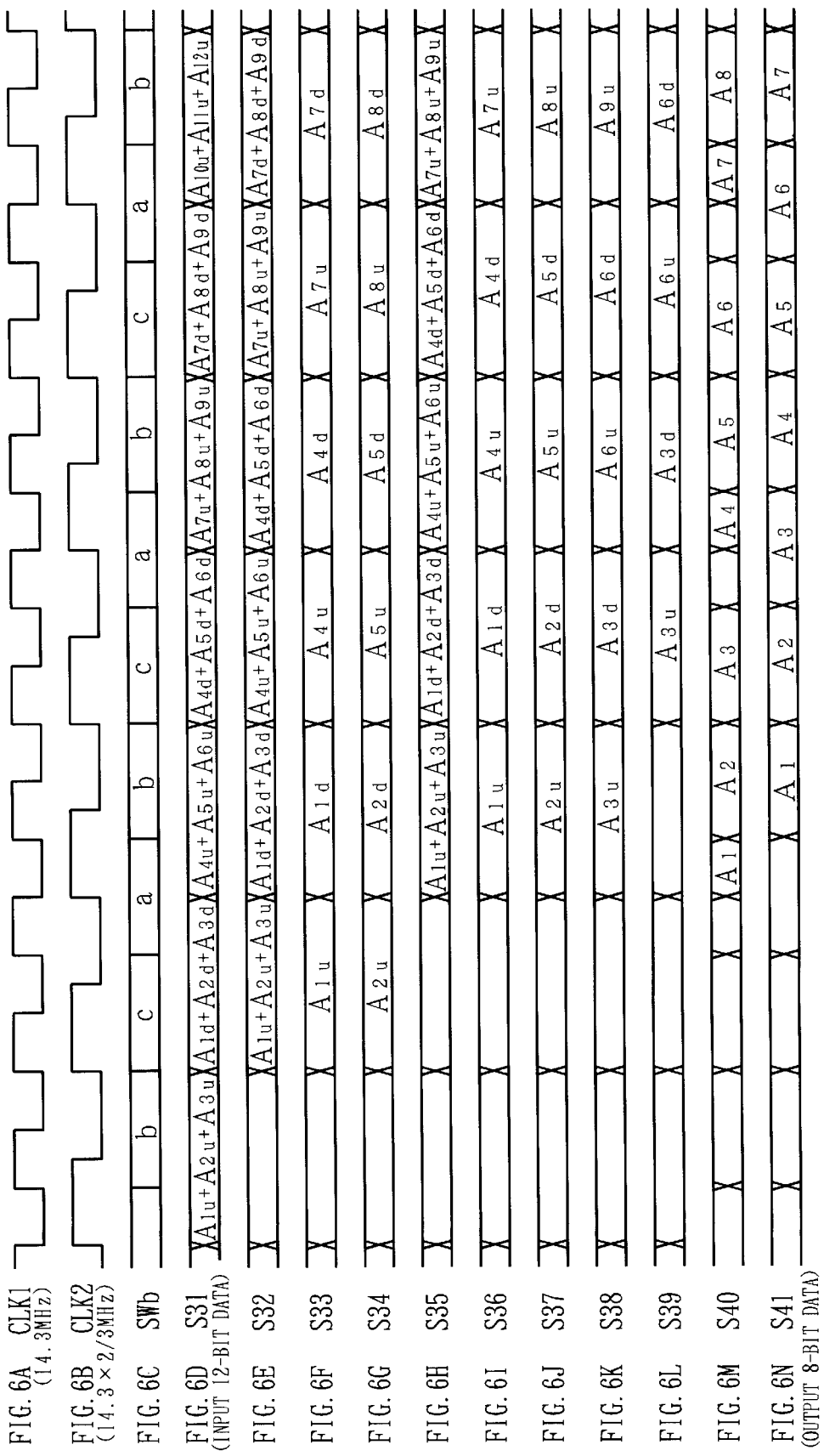
FIG. 6 including

Incidentally, codes such as $A_{1u}$, $A_{1d}$, . . . added to the data in FIG. 6 correspond to the codes added to the data in FIG. 4. It is understood that if FIGS. 4 and 6 are taken in combination, then the 12-bit data obtained as a result of conversion by the bit converter 21 can be reset or restored to the original 8-bit data by the bit converter 29.

Figure 7:
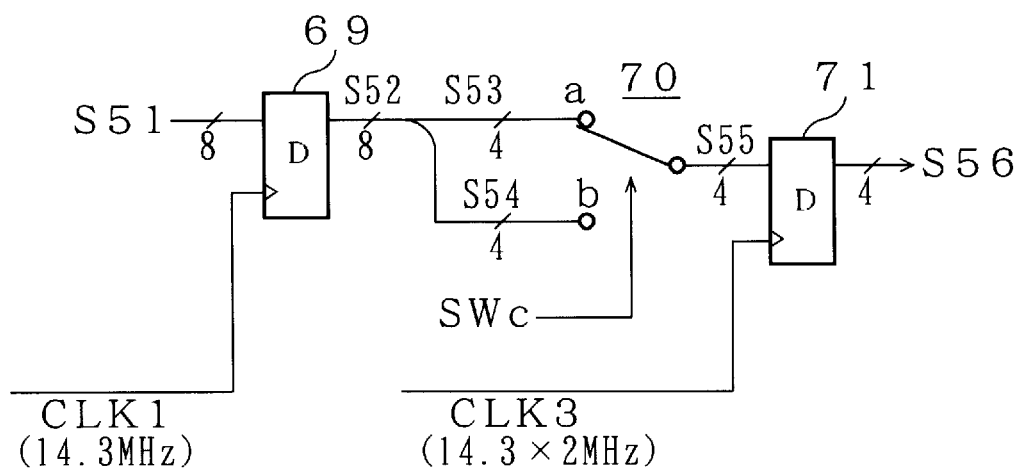
FIG. 7 is a connection diagram illustrating a configuration of a bit converter (8→4)

FIG. 7 illustrates the configuration of the bit converter 40. In the drawing, input 8-bit data S51 (sampling frequency: 14.3 MHz) is supplied to a latch circuit 69 composed of a D flip-flop. The leftmost 4-bit data S53 of 8-bit data S52 outputted from the latch circuit 69 is supplied to a fixed terminal on the a side of a changeover switch 70 which constitutes a selector, and the rightmost 4-bit data S54 thereof is supplied to a fixed terminal on the b side of the changeover switch 70. Further, 4-bit data S55 outputted from the changeover switch 70 is supplied to a latch circuit 71 composed of a D flip-flop. Thus, output 4-bit data S56 (sampling frequency: 14.3×2 MHz) is outputted from the latch circuit 71.

Further, the latch circuit 69 is supplied with a clock CLK1 (shown in FIG. 8A) of 14.3 MHz as a latch clock. The latch circuit 71 is supplied with a clock CLK3 (shown in FIG. 8B) as a latch clock. The changeover switch 70 is selectively switched to the a or b side in response to a switch control signal SWc (shown in FIG. 8C) synchronized with the clock CLK3.

When the input 8-bit data S51 is represented as shown in FIG. 8D under the above construction, the output data S52 of the latch circuit 69 is represented as illustrated in FIG. 8E and the fixed terminals on the a and b sides of the changeover switch 70 are respectively supplied with 4-bit data S53 and S54 shown in FIGS. 8F and 8G. The 4-bit data S55 outputted from the changeover switch 70 is represented as shown in FIG. 8H and hence output 4-bit data S56 (sampling frequency: 14.3×2 MHz) shown in FIG. 8I is obtained from the latch circuit 71. In FIG. 8, the data added with "u" as represented as $B_{1u}$, $B_{2u}$, . . . , respectively show the leftmost 4-bit data of 8-bit data of $B_1$, $B_2$, . . . , and the data added with "d" as represented as $B_{1d}$, $B_{2d}$, . . . , respectively show the rightmost 4-bit data of the 8-bit data of $B_1$, $B_2$, . . .

Figure 9:
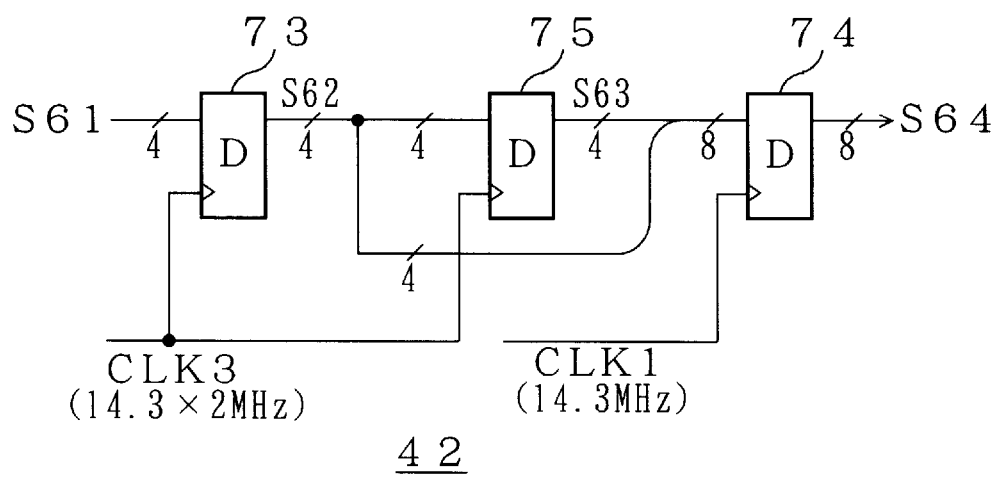
FIG. 9 is a connection diagram depicting a configuration of a bit converter (4→8)

FIG. 9 shows the configuration of the bit converter 42. In the drawing, input 4-bit data S61 (sampling frequency: 14.3×2 MHz) is supplied to a latch circuit 73 composed of a D flip-flop. 4-bit data S62 outputted from the latch circuit 73 is supplied to a latch circuit 74 composed of a D flip-flop as the rightmost 4-bit data. Further, the 4-bit data S62 outputted from the latch circuit 73 is supplied to a latch circuit 75 composed of a D flip-flop and 4-bit data S63 outputted from the latch circuit 75 is supplied to a latch circuit 74 as the leftmost 4-bit data. Thereafter, output 8-bit data S64 (sampling frequency: 14.3 MHz) is outputted from the latch circuit 74.

Further, the latch circuits 73 and 75 are respectively supplied with a clock CLK3 (shown in FIG. 10B) of 28.6 MHz as a latch clock. The latch circuit 74 is supplied with a clock CLK1 (shown in FIG. 10A) of 14.3 MHz as a latch clock.

When the input 4-bit data S61 is represented as shown in FIG. 10C under the above construction, the output data S62 of the latch circuit 73 is represented as shown in FIG. 10D. The 4-bit data S62 is supplied to the latch circuit 74 as the rightmost 4-bit data. Further, the output data S63 of the latch circuit 75 is represented as shown in FIG. 10E. The 4-bit data S63 is supplied to the latch circuit 74 as the leftmost 4-bit data. Thereafter, output 8-bit data S64 (sampling frequency: 14.3 MHz) shown in FIG. 10F is obtained from the latch circuit 74.

Incidentally codes such as $B_{1u}$, $B_{1d}$, . . . added to the data in FIG. 10 correspond to the codes added to the data in FIG. 8. It is understood that if FIGS. 8 and 10 are seen in combination, the 4-bit data obtained as a result of conversion by the bit converter 40 can be reset or restored to the original 8-bit data by the bit converter 42.

The operation of the signal separation circuit 5 shown in FIG. 2 will next be described.

A description will first be made of the case where the video signal SV is derived from the NTSC broadcast. Since the changeover switches 48 and 49 are electrically connected to the N sides in this case, the memories 26 and 27 are respectively supplied with the clock CLK2 of $14.3 \times 2/3$ MHz as the operating clock. Further, since the changeover switch 47 is electrically connected to the N side, the memories 26 and 27 are supplied with the reset signal VRST1 so that the write and read addresses are reset for each frame.

Further, the changeover switches 22, 25 and 28 are electrically connected to the N sides. Therefore, the 8-bit data composed of the four leftmost bits and four midmost bits, of the 12-bit data (see the data S24 in FIG. 4Q) obtained as a result of conversion of the video signal SV (see the data S11 in FIG. 4D) corresponding to the 8-bit data by the bit converter 21 is supplied to the memory 26 through the changeover switch 22. Further, the rightmost 4-bit data is supplied to the memory 27 through the changeover switch 25 and sequentially written therein.

Next, the 12-bit data (see the data S31 in FIG. 6D) composed. of the 8-bit data and 4-bit data read from the memories 26 and 27 after having been delayed substantially by one frame period, is converted into the 8-bit data (see the data S41 in FIG. 6N) by the bit converter 29. The resultant 8-bit data is supplied via the changeover switch 28 to the subtracter 23 where the 8-bit data is subtracted from the video signal SV.

The amount of delay in data transmission by the bit converter 29 is taken into consideration although not described above. Further, the timing for reading the data from each of the memories 26 and 27, is controlled so that the 8-bit data supplied to the subtracter 23 from the bit converter 29 through the changeover switch 28 is delayed from the video signal SV by one frame period (525-horizontal-line period). Thus, a C-type three-dimensional comb filter is made up of the memories 26 and 27, bit converters 21 and 29 and subtracter 23. A carrier chrominance signal $C_{FL}$ is obtained from the subtracter 23 in accordance with a frame-to-frame process.

Since the video signal SV is supplied to the C-type two-dimensional comb filter composed of the line memory 30 and the subtracter 31, a carrier chrominance signal $C_{LI}$ subjected to a line-to-line process is obtained from the subtracter 31. Thus, a carrier chrominance signal C obtained by adding the carrier chrominance signal $C_{FL}$ subjected to the frame-to-frame process and the carrier chrominance signal $C_{LI}$ subjected to the line-to-line process together according to a motion-dependent ratio is obtained as a signal to be output from the adder 34. Since the connecting switch 44 is in an OFF state in this case, the carrier chrominance signal C outputted from the adder 34 becomes data outputted from the signal separation circuit 5 through the subtracter 43 as it is.

Further, the carrier chrominance signal C outputted from the adder 34 is supplied to the subtracter 38 where it is subtracted from the video signal SV. Therefore, a luminance signal Y is obtained from the subtracter 38. The resultant luminance signal Y is timed by the delay circuit 39 after which it is obtained as the output data of the signal separation circuit 5.

Figure 11A:
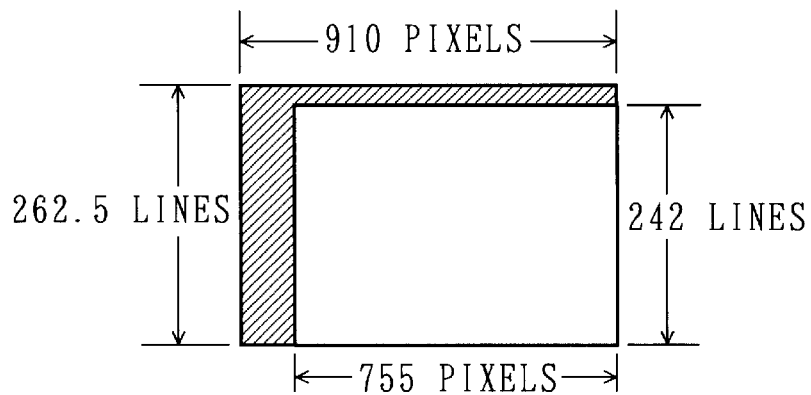
FIGS. 11A–11B is a diagram for describing the number of pixels at the time of NTSC broadcasts and the number of pixels at the time of EDTV2 broadcasts.

The number of pixels to be written into and read from each of the memories 26 and 27 upon NTSC broadcasting, will now be described with reference to FIG. 11A.

When the width of pixel data is regarded as 8 bit/4 bit, the number of pixels is given by the following expressions (1) and (2).

$$2M \text{ bits} = 8 \text{ bits} \times 262144 \tag{1}$$

$$1M \text{ bit} = 4 \text{ bits} \times 262144 \tag{2}$$

When sampling is done at a clock rate of 4 fsc (14.3 MHz), the number of pixels per frame is given by the following expression (3)

$$910 \times 262.5 \times 2 = 477750 \tag{3}$$

In the case of the number of the pixels given by the expression (3), the video signal SV corresponding to the 8-bit data cannot be delayed by one frame in a memory capacity of 3M bits. Therefore, the following process is executed and each memory is used in this condition. Namely, it is not necessary for the three-dimensional comb filter to effect an arithmetic operation on all the pixels upon NTSC broadcasting. A computation may be performed using pixels located within an effective screen exclusive of a vertical blanking interval and horizontal blanking interval (corresponding to a portion indicated by an oblique line in FIG. 11A). The number of the pixels within the effective screen is given by the following expression (4)

$$755 \times 242 \times 2 = 365420 \tag{4}$$

Since the data width is 8 bits per pixel, data corresponding to three pixels are compiled and the respective data are respectively divided into the four leftmost bits and the four rightmost bits. The respective data are respectively converted into 12-bit data compiled in the form of the leftmost bits and the rightmost bits. Thus, the number of pixels within the effective screen is apparently given by the following expression (5).

$$365420 \times (8/12) = 243613.33 \tag{5}$$

Thus, the data corresponding to the pixels within the effective screen can be delayed based on the expressions (1), (2) and (5) by one frame period by dividing the 12-bit data converted by the bit converter 21 into the 8-bit and 4-bit data and writing them into their corresponding memories 26 and 27 as in the example shown in FIG. 2. A three-dimensional comb filter can be realized upon NTSC broadcast using the memory whose capacity is 3M bits in total. Although not described above, a portion (corresponding to the vertical blanking interval and horizontal blanking interval) other than the effective screen needs to fix the operations of the memories 26 and 27 by, for example, stopping the supply of the clock CLK2.

A description will next be made of the case where the video signal SV is derived from the EDTV2 broadcast. Since the changeover switch 48 is electrically connected to the E side in this case, the memory 26 is supplied with the clock CLK1 of 14.3 MHz as the operating clock. Further, the memory 26 is supplied with the reset signal VRST1 so that the write and read addresses are reset for each frame.

Further, the changeover switches 22 and 28 are respectively electrically connected to the E sides. Therefore, the video signal SV corresponding to the 8-bit data is supplied to the memory 26 and sequentially written therein. Next, the 8-bit data read from the memory 26 after having been delayed by one frame period, is supplied via the changeover switch 28 to the subtracter 23 where it is subtracted from the video signal SV. Thus, a C-type three-dimensional comb filter is constructed of the memory 26 and the subtracter 23. A signal ($C_{FL}$+HH'$_{FL}$) obtained by combining together a carrier chrominance signal $C_{FL}$ and a horizontal resolution supplementary signal HH'$_{FL}$ subjected to a frame-to-frame process is obtained from the subtracter 23.

Since the video signal SV is supplied to the C-type two-dimensional comb filter composed of the line memory 30 and the subtracter 31, a signal ($C_{LI+HH'LI}$) obtained by combining together a carrier chrominance signal $C_{LI}$ and a horizontal resolution supplementary signal HH'$_{LI}$ subjected to a line-to-line process can be produced from the subtracter 31. Therefore, a composite signal (C+HH') obtained by adding the combined signal ($C_{FL}$+HH'$_{FL}$) subjected to the frame-to-frame process and the combined signal ($C_{LI+HH'LI}$) subjected to the line-to-line process according to a motion-dependent ratio is obtained as the output data of the adder 34.

Further, since the changeover switch 49 is electrically connected to the E side, the memory 27 is supplied with the clock CLK3 of 14.3×2 MHz as the operating clock. Since the changeover switch 47 is electrically connected to the E side, the memory 27 is supplied with the reset signal VRST2 so that the write and read addresses are reset for each field.

Furthermore, the changeover switch 25 is electrically connected to the E side. Therefore, the composite signal (C+HH') (see the data S51 in FIG. 8D) corresponding to the 8-bit data is converted into the 4-bit data (see the data S56 in FIG. 8I) by the bit converter 40. The resultant 4-bit data is supplied to the memory 27 through the changeover switch 25 and sequentially written therein. The 4-bit data (see the data S61 in FIG. 10C) read from the memory 27 after having been delayed by one frame period, is converted into the 8-bit data (see the data S64 in FIG. 10F) by the bit converter 42. The resultant 8-bit data is supplied to the subtracter 41 where the subtraction of the 8-bit data from the composite signal (C+HH') is carried out.

The amount of delay in data transmission by the bit converter 42 is taken into consideration although not described above. Further, the timing for reading the data from the memory 27, is controlled so that the 8-bit data supplied to the subtracter 41 from the bit converter 42 is delayed from the composite signal (C+HH') by one field period (262-horizontal-line period). Thus, a three-dimensional comb filter is made up of the memory 27, bit converters 40 and 42 and subtracter 41. A horizontal resolution supplementary signal HH' is obtained from the subtracter 41 in accordance with a field-to-field process.

Since the connecting switch 44 is in an ON condition in this case, the horizontal resolution supplementary signal HH' outputted from the subtracter 41 is supplied via the connecting switch 44 to the decoder 45 from which a horizontal luminance high-frequency component $Y_{HH}$ is obtained. The resultant horizontal luminance high-frequency component $Y_{HH}$ is generated as the output data of the signal separation circuit 5.

Since the connecting switch 44 is in the ON state, the horizontal resolution supplementary signal HH' outputted from the subtracter 41 is supplied via the connecting switch 44 to the subtracter 43 where it is subtracted from the composite signal (C+HH'). Therefore, a carrier chrominance signal C is obtained from the subtracter 43, which is used as the output data of the signal separation circuit 5.

Further, the composite signal (C+HH') outputted from the adder 34 is supplied to the subtracter 38 where it is subtracted from the video signal SV. Therefore, a luminance signal Y is obtained from the subtracter 38. The resultant luminance signal Y is timed by the delay circuit 39 after which it is produced as the output data of the signal separation circuit 5.

Figure 11B:
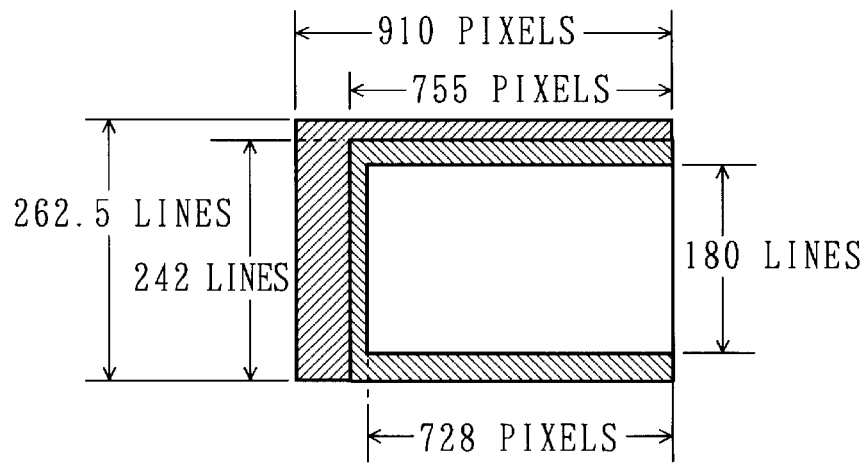

A description will now be made of the number of pixels to be written into and read from each of the memories 26 and 27 upon EDTV2 broadcast with reference to FIG. 11B. Since an image at the time of the EDTV2 broadcast is transmitted in the letter box system as described above, the following process is executed to use each memory. Namely, an image exists in a main figure portion corresponding to part of the effective screen in the letter box system. A three-dimensional comb filter at the time of the EDTV2 broadcast may perform computations using pixels in the main figure portion. The number of the pixels in the main figure portion is given by the following expression (6). A 2M-bit memory lacks in capacity.

$$755 \times 180 \times 2 = 271800 > 262144 \tag{6}$$

However, overscanned pixels, which are not displayed within the screen, exist in 755 pixels per line excluding the horizontal blanking interval. Therefore, if 27 pixels regarded as the overscanned pixels are processed by thinning, then the number of pixels is given by the following expression (7).

$$728 \times 180 \times 2 = 262080 < 262144 \tag{7}$$

Thus, a three-dimensional comb filter for separating the luminance signal Y and the composite signal (C+HH') from the video signal SV can be realized from the expressions (1) and (7) using the 2M-bit memory 26 as in the example illustrated in FIG. 2. Although not described above, a portion other than the main figure portion or the thinned overscanned-portion needs to fix the operation of the memory 26 by, for example, stopping the supply of the clock CLK1.

Further, a three-dimensional comb filter for separating the horizontal resolution supplementary signal HH' from the composite signal (C+HH') can be materialized by delaying a composite signal (C+HH') obtained in association with the number of pixels given by the expression (7) by one filed period. The three-dimensional comb filter can be configured using a memory capable of writing therein data corresponding to the number of pixels given by the following expression (8).

$$728 \times 180 = 130860 < 262144 \tag{8}$$

However, the composite signal (C+HH') has a data width of 8 bits and is unsuitable for an input data width of a 1M-bit memory. Thus, as in the example shown in FIG. 2, the 8-bit data is converted into the 4-bit data by the bit converter 40 and thereafter the converted 4-bit data is written into the 1M-bit memory 27. The number of pixels is apparently represented as the following expression (9) by changing the data width to another.

$$728 \times 180 \times 2 = 261720 < 262144 \tag{9}$$

Thus, the three-dimensional comb filter for separating the horizontal resolution supplementary signal HH' from the composite signal (C+HH') can be realized using the 1M-bit memory 27. Similarly to the memory 26, a portion other than a main figure portion or a thinned overscanned-portion needs to fix the operation of the memory 27 by, for example, stopping the supply of the clock CLK3.

According to the present embodiment as described above, the three-dimensional comb filter for separating the carrier chrominance signal C from the video signal SV is configured using the 2M-bit memory 26 and the 1M-bit memory 27 upon NTSC broadcast. On the other hand, upon EDTV2 broadcast, the three-dimensional comb filter for separating the composite signal (C+HH') from the video signal SV is configured using the 2M-bit memory 26. Further, the three-dimensional comb filter for separating the horizontal resolution supplementary signal HH' from the composite signal (C+HH') is configured. Accordingly, the capacity of the 3M-bit memory corresponding to the memories 26 and 27 can be efficiently used and hence the system can be made compact.

Figure 12:
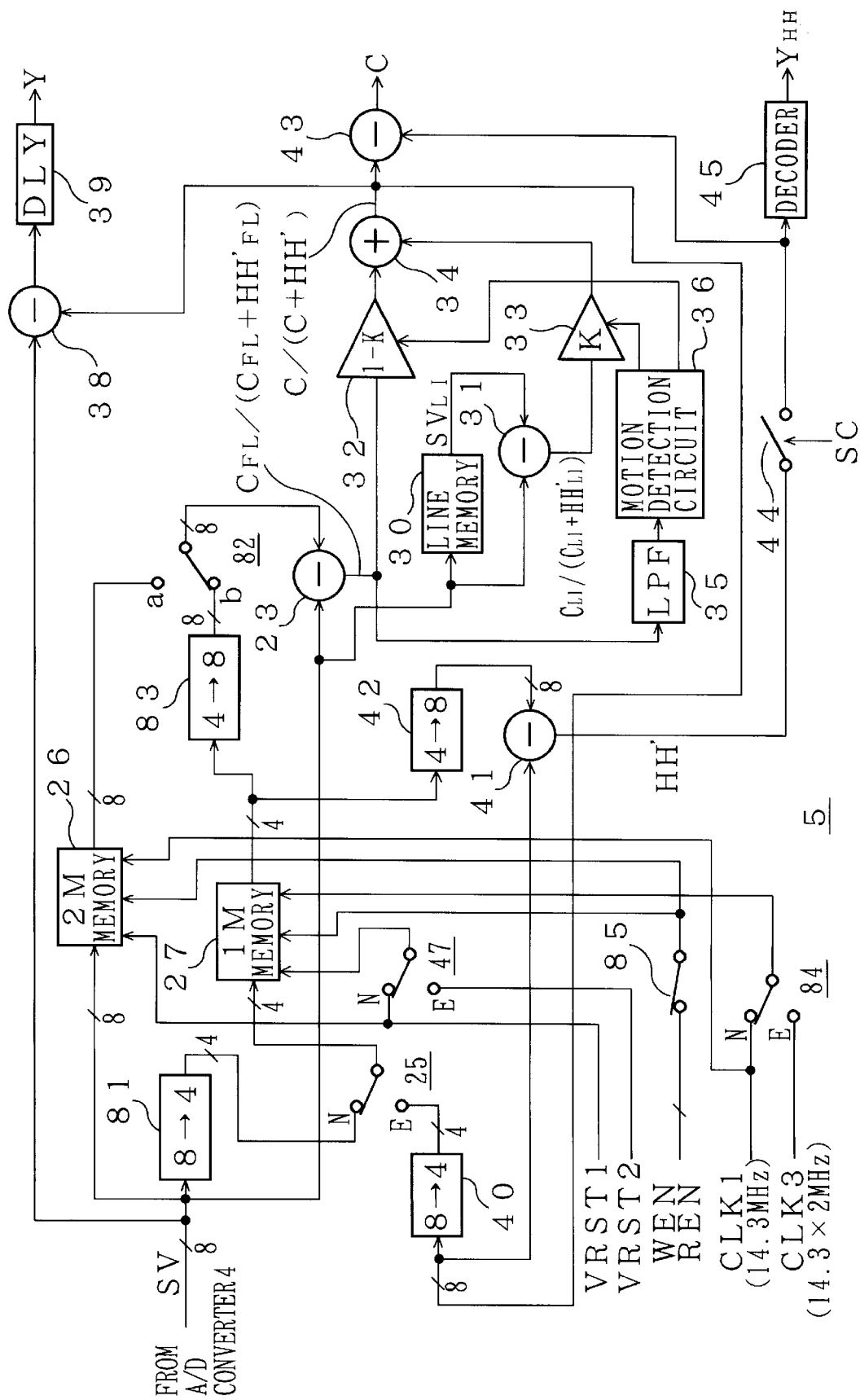
FIG. 12 is a block diagram illustrating another configuration of a signal separation circuit.

Another configuration of the signal separation circuit 5 will next be described with reference to FIG. 12. In FIG. 12, elements of structure associated with those shown in FIG. 2 are identified by like reference numerals and their detailed description will therefore be omitted. In the drawing, a video signal SV corresponding to 8-bit data outputted from an A/D converter 4 is supplied to a 2M-bit memory 26 as write data and supplied to a bit converter 81. The bit converter 81 is used to convert the 8-bit data into 4-bit data. The output data (corresponding to the 4-bit data) of the bit converter 81 is supplied to a fixed terminal on the N side of a changeover switch 25.

Data (corresponding to the 8-bit data) read from the memory 26 is supplied to a fixed terminal on the a side of a changeover switch 82. Data (corresponding to the 4-bit data) read from a memory 27 is supplied to a bit converter 83. The bit converter 83 is used to convert the 4-bit data into 8-bit data. The output data (corresponding to the 8-bit data) of the bit converter 83 is supplied to a fixed terminal on the b side of the changeover switch 82. The output data (corresponding to the 8-bit data) of the changeover switch 82 is supplied to a subtracter 23.

Further, a clock CLK1 of 14.3 MHz is supplied to the memory 26 as an operating clock and supplied to a fixed terminal on the N side of a changeover switch 84. A fixed terminal on the E side of the changeover switch 84 is supplied with a clock CLK3 of 14.3×2 MHz. An output signal of the changeover switch 84 is supplied to the memory 27 as an operating clock.

When the changeover switch 84 is now selectively controlled based on a decision or criterion signal SC and the video signal SV is derived from an NTSC broadcast, the changeover switch 84 is electrically connected to the N side thereof. On the other hand, when the video signal SV is derived from an EDTV2 broadcast, the changeover switch 84 is electrically connected to the E side thereof. Thus, when the video signal SV results from the NTSC broadcast, the clock CLK1 is supplied to the memory 27 as the operating clock. When the video signal SV is derived from the EDTV2 broadcast, the clock CLK3 is supplied to the memory 27 as the operating clock.

Further, the memories 26 and 27 are respectively supplied with a write enable signal WEN and a read enable signal REN through a connecting switch 85. The connecting switch 85 is on/off-controlled based on the criterion signal SC. When the video signal SV is derived from the NTSC broadcast in this condition, the connecting switch 85 is turned ON. On the other hand, when the video signal SV is derived from the EDTV2 broadcast, the connecting switch 85 is turned OFF. Thus, when the video signal SV is derived from the NTSC broadcast, the memories 26 and 27 are respectively supplied with the enable signals WEN and REN. The writing of data into and reading it from each of the memories 26 and 27 are stopped every three clocks at which the enable signals WEN and REN are respectively brought to a low level "L". On the other hand, when the video signal SV is derived from the EDTV2 broadcast, no enables signals WEN and REN are respectively supplied to the memories 26 and 27 and the data is continuously written into and read from each of the memories 26 and 27. The signal separation circuit 5 shown in FIG. 12 is similar in other configuration to that illustrated in FIG. 2.

Figure 13:
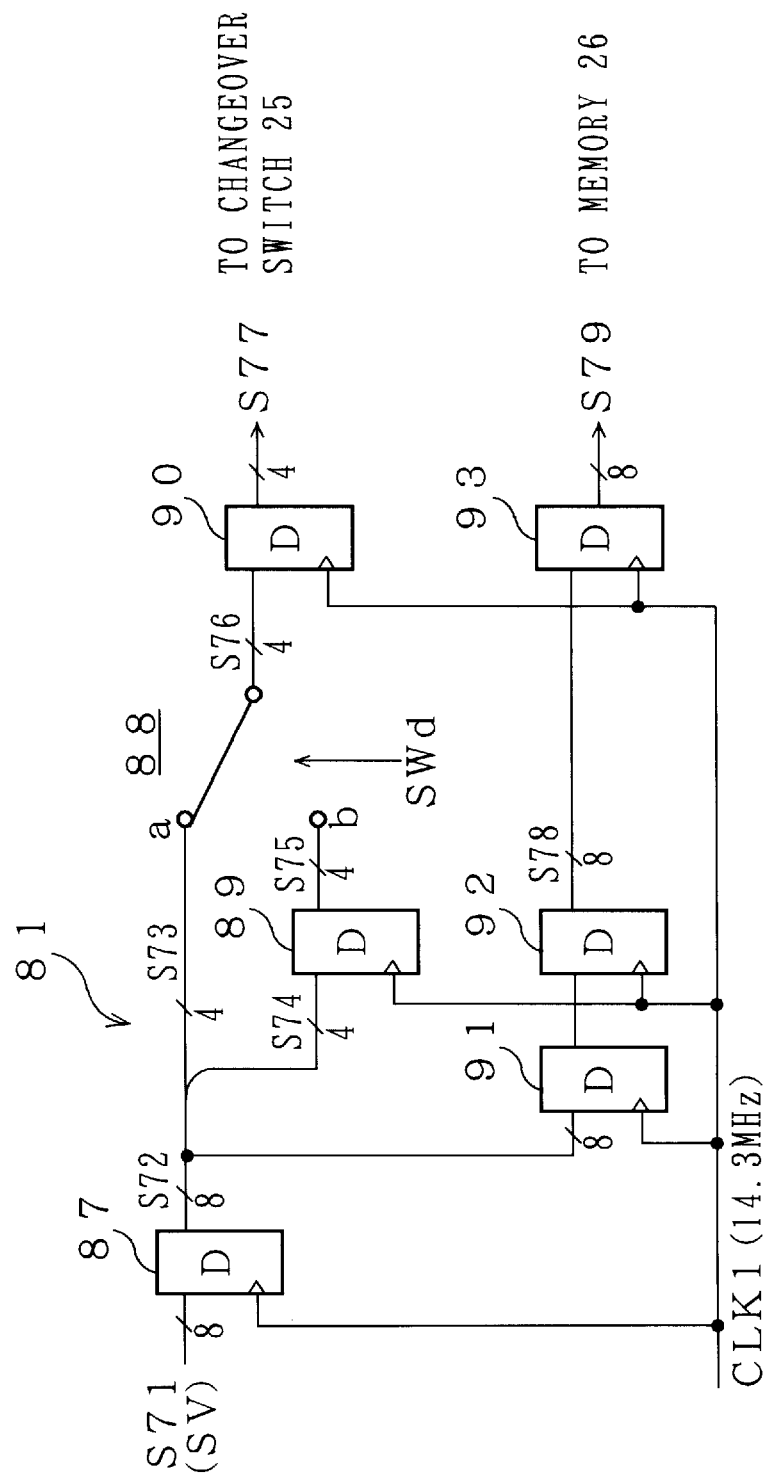
FIG. 13 is a connection diagram showing configurations of a bit converter (8→4) and a peripheral circuit thereof.

FIG. 13 illustrates configurations of the bit converter 81 and its peripheral circuit. The example illustrated in FIG. 12 describes the case where the video signal SV is directly supplied to the memory 26. However, the video signal SV is actually supplied to the memory 26 through a latch circuit for time adjustment.

In the drawing, input 8-bit data S71 (sampling frequency: 14.3 MHz) is supplied to a latch circuit 87 composed of a D flip-flop. The leftmost 4-bit data S73 of 8-bit data S72 outputted from the latch circuit 87 is supplied to a fixed terminal on the a side of a changeover switch 88 which constitutes a selector, whereas the rightmost 4-bit data S74 thereof is supplied to a latch circuit 89. 4-bit data S75 outputted from the latch circuit 89 is supplied to a fixed terminal on the b side of the changeover switch 88. 4-bit data S76 outputted through the changeover switch 88 is supplied to a latch circuit 90 composed of a D flip-flop. Next, output 4-bit data S77 (sampling frequency: 14.3 MHz) is obtained from the latch circuit 90. The resultant output 4-bit data S77 is supplied to the fixed terminal on the N side of the changeover switch 25. In this case, the bit converter 81 is comprised of the latch circuits 87, 89 and 90 and the changeover switch 88.

Further, the 8-bit data S72 outputted from the latch circuit 87 is supplied to a series circuit of latch circuits 91 and 92 each composed of a D flip-flop. 8-bit data S78 outputted from the latch circuit 92 is supplied to a latch circuit 93 composed of a D flip-flop. Further, 8-bit data S79 (sampling frequency: 14.3 MHz) outputted from the latch circuit 93 is supplied to the memory 26 as write data. Thus, the video signal SV is timed by the latch circuits 87 and 91 through 93, followed by supply to the memory 26.

Further, the latch circuits 87, 89 and 90 through 93 are respectively supplied with a clock CLK1 (shown in FIG. 14A) of 14.3 MHz as a latch clock. The changeover switch 88 is selectively changed to the a or b side in response to a switch control signal SWd (illustrated in FIG. 14B) synchronized with the clock CLK1.

When the input 8-bit data S71 is represented as shown in FIG. 14D under the above configuration, the output data S72 of the latch circuit 87 is as illustrated in FIG. 14E and the fixed terminal on the a side of the changeover switch 88 is supplied with 4-bit data S73 shown in FIG. 14F. In addition, the latch circuit 89 is supplied with 4-bit data S74 illustrated in FIG. 14G and the fixed terminal on the b side of the changeover switch 88 is supplied with 4-bit data S75 shown in FIG. 14H. Next, 4-bit data S76 shown in FIG. 14I is outputted from the changeover switch 88. Thus, output 4-bit data S77 (sampling frequency: 14.3 MHz) shown in FIG. 14J is obtained from the latch circuit 90. Further, the output data S78 of the latch circuit 92 is represented as shown in FIG. 14K. Thus, 8-bit data S79 (sampling frequency: 14.3 MHz) shown in FIG. 14L is obtained from the latch circuit 93.

Figure 14:
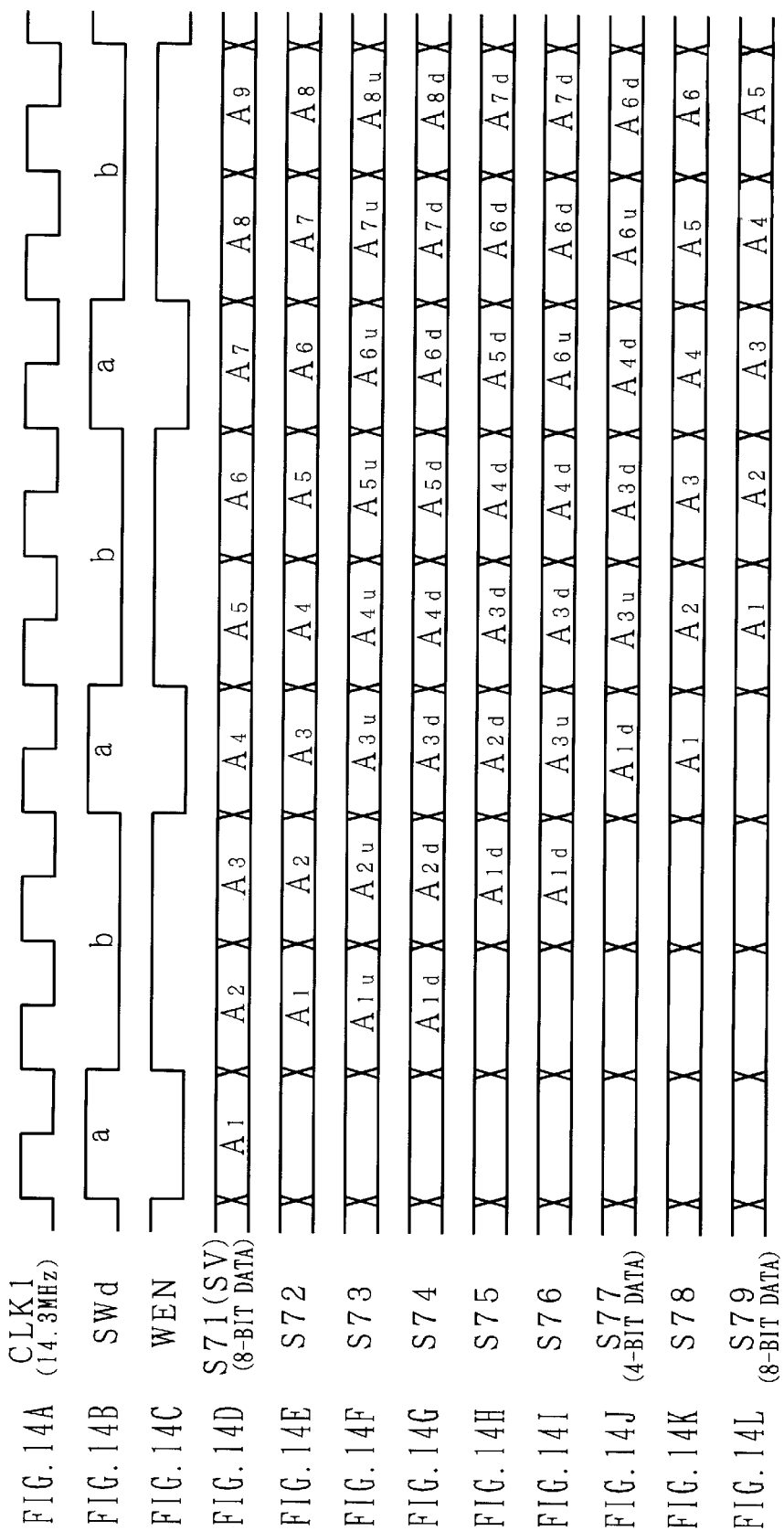
FIG. 14 including

Incidentally, the data added with "u" as in the case of $A_{1u}$, $A_{2u}$, . . . , in FIG. 14 respectively show the leftmost 4-bit data of the 8-bit data like $A_1$, $A_2$, . . . The data added with "d" as in the case of $A_{1d}$, $A_{2d}$, . . . respectively the rightmost 4-bit data of the 8-bit data like $A_1$, $A_2$, . . . FIG. 14C shows a writ enable signal WEN. Writing is carried out only during an interval in which the enable signal WEN is at a high level "H". Thus, as will be described later, 8-bit data of $A_1$, $A_2$, $A_4$, $A_5$, . . . can be written into the memory 26 and 4-bit data of $A_{3u}$, $A_{3d}$, $A_{6u}$, $A_{6d}$, . . . can be written into the memory 27 upon NTSC broadcasting.

Figure 15:
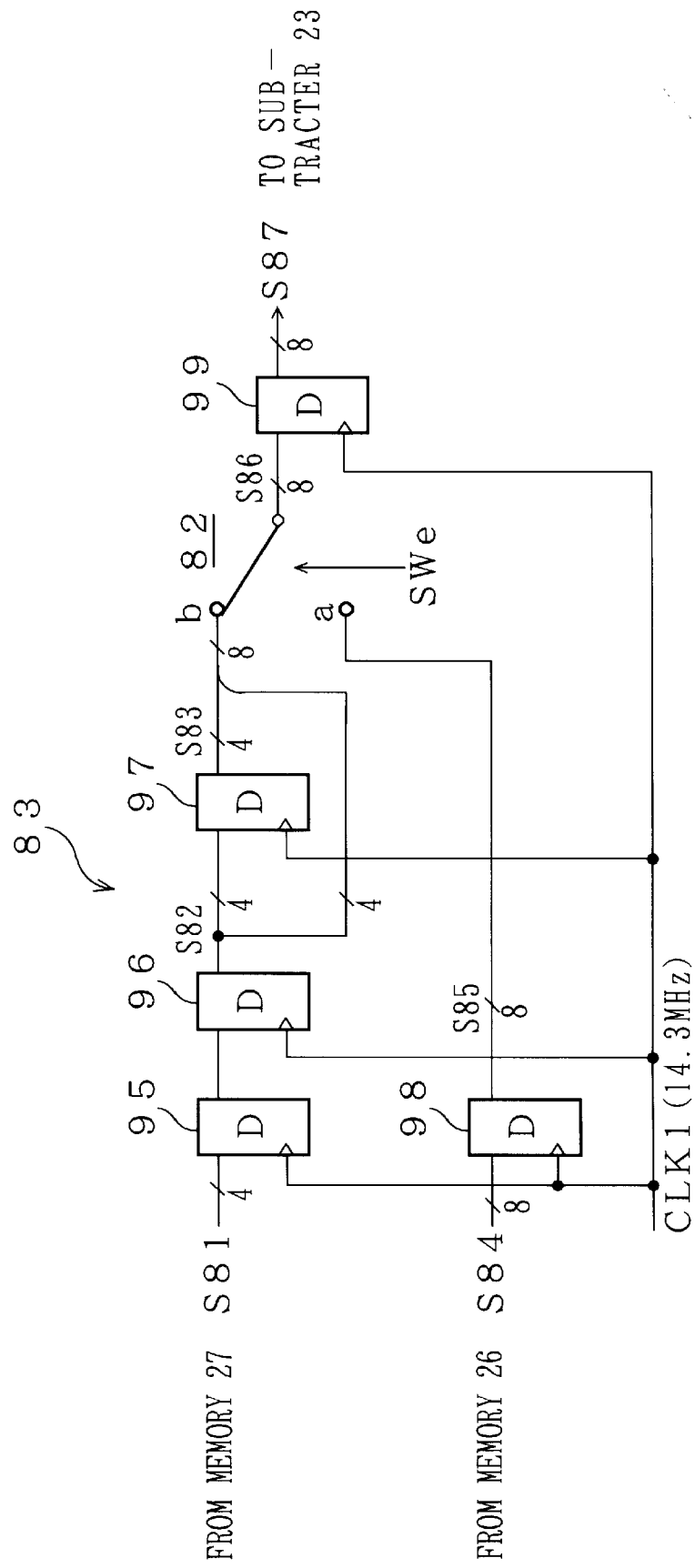
FIG. 15 is a connection diagram illustrating configurations of a bit converter (4→8) and a peripheral circuit thereof.

FIG. 15 shows configurations of the bit converter 83 and its peripheral circuit. The example illustrated in FIG. 12 describes the case where the data (8-bit data) read from the memory 26 is directly supplied to the fixed terminal on the a side of the changeover switch 82. However, the data is actually supplied to the fixed terminal through a latch circuit for time adjustment.

In the drawing, the input 4-bit data S81 (sampling frequency: 14.3 MHz) corresponding to the data read from the memory 27 is supplied to a series circuit of latch circuits 95 and 96 each composed of a D flip-flop. 4-bit data S82 outputted from the latch circuit 96 is supplied to the fixed terminal on the b side of the changeover switch 82 as the rightmost 4-bit data and supplied to a latch circuit 97 composed of a D flip-flop. Further, 4-bit data S83 outputted from the latch circuit 97 is supplied to the fixed terminal on the b side of the changeover switch 82 as the leftmost 4-bit data. The aforementioned latch circuits 95 through 97 constitute the bit converter 83.

The data (8-bit data) S84 read from the memory 26 is supplied to a latch circuit 98 composed of a D flip-flop. 8-bit data S85 outputted from the latch circuit 98 is supplied to the fixed terminal on the a side of the changeover switch 82. 8-bit data S86 outputted from the changeover switch 82 is supplied to a latch circuit 99 composed of a D flip-flop. Thereafter, 8-bit data S87 (sampling frequency: 14.3 MHz) is outputted from the latch circuit 99, followed by supply to the subtracter 23.

Further, the latch circuits 95 through 99 are respectively supplied with a clock CLK1 (shown in FIG. 16A) of 14.3 MHz as a latch clock. Upon NTSC broadcasting, the changeover switch 82 is supplied with a switch control signal SWe (shown in FIG. 16B) synchronized with the clock CLK1 so as to be selectively changed to the a or b side. Upon EDTV2 broadcasting, the changeover switch 82 remains connected to the a side.

Since the memories 26 and 27 are respectively supplied with a read enable signal REN shown in FIG. 16C under the above construction upon NTSC broadcast, the input 4-bit data S81 corresponding to the data read from the memory 27 is represented as shown in FIG. 16D and the 8-bit data S84 corresponding to the data read from the memory 26 is represented as shown in FIG. 16G. Therefore, the output data S82 of the latch circuit 96 is represented as shown in FIG. 16E and supplied to the fixed terminal on the b side of the changeover switch 82 as the rightmost 4-bit data.

The output data S83 of the latch circuit 97 is represented as shown in FIG. 16F and supplied to the fixed terminal on the b side of the changeover switch 82 as the leftmost 4-bit data. Further, the output data S85 of the latch circuit 98 is represented as shown in FIG. 16H and supplied to the fixed terminal on the a side of the changeover switch 82. Therefore, the 8-bit data S86 outputted from the changeover switch 82 is represented as shown in FIG. 16I and such 8-bit data S87 as shown in FIG. 16J is outputted from the latch circuit 99.

On the other hand, upon EDTV2 broadcasting, the changeover switch 82 remains connected to the a side thereof. Therefore, the read data (8-bit data) sequentially outputted from the memory 26 is supplied to the subtracter 23 through the latch circuits 98 and 99.

Incidentally, codes such as $A_{1u}$, $A_{id}$, etc. applied to the data in FIG. 16 are associated with those applied to the data in FIG. 14. If FIGS. 14 and 16 are considered in combination, then the 4-bit and 8-bit data obtained as a result of processing by the bit converter 81 or the like can be restored to the original 8-bit data by being processed by means of the bit converter 83 or the like.

The operation of the signal separation circuit 5 shown in FIG. 12 will next be described.

A description will first be made of the case in which the video signal SV is derived from the NTSC broadcast. Since the changeover switch 84 is electrically connected to the N side in this case, the memories 26 and 27 are respectively supplied with the clock CLK1 of 14.3 MHz as the operating clock. Further, since the changeover switch 47 is electrically connected to the N side, the memories 26 and 27 are respectively supplied with a reset signal VRST1 so that write and read addresses are reset for each frame. Since the connecting switch 85 is turned ON, each of the memories 26 and 27 is supplied with the write and read enable signals WEN and REN so that the writing of data into and reading of it therefrom are respectively stopped every three clocks.

Further, the changeover switch 25 is electrically connected to the N side. Therefore, the 8-bit data (see the data S79 shown in FIG. 14L) corresponding to the video signal SV is supplied to the memory 26 and sequentially written therein. Further, the 4-bit data (refer to the data S77 shown in FIG. 14J) outputted from the bit converter 81 is supplied to the memory 27 through the changeover switch 25 and sequentially written therein. Since the writing of the data into each of the memories 26 and 27 is stopped every three clocks at which the write enable signal WEN is brought to the low level "L", data, which corresponds to two pixels, of data corresponding to continuous three pixels, of the video signal SV, is consequently written into the memory 26 and data corresponding to the remaining one pixel is written into the memory 27.

The 8-bit data (see the data S84 shown in FIG. 16G) and 4-bit data (see the data S81 shown in FIG. 16D), which are respectively delayed substantially by one frame period and read at intermittent intervals from the memories 26 and 27 based on the read enable signal REN, are processed by the bit converter 83, the changeover switch 82 and the like so as to be reset or restored to the original 8-bit data (see the data S87 shown in FIG. 16J). The so-restored 8-bit data is supplied to the subtracter 23 where it is subtracted from the video signal SV.

The amount of delay in data transmission by the bit converter 83 or the like is taken into consideration although not described above. Further, the timing for reading the data from each of the memories 26 and 27, is controlled so that the 8-bit data supplied to the subtracter 23 is delayed from the video signal SV by one frame period. Thus, a C-type three-dimensional comb filter is constructed of the memories 26 and 27, the subtracter 23 and the like. A carrier chrominance signal $C_{FL}$ subjected to a frame-to-frame process is obtained from the subtracter 23.

Other operation of the signal separation circuit 5 at the time of the NTSC broadcast is similar to that of the example shown in FIG. 2. A luminance signal Y and a carrier chrominance signal C are outputted as the output data of the signal separation circuit 5. The number of pixels to be written into and read from the memories 26 and 27 upon NTSC broadcasting as described above is controlled to the number of pixels located only within an effective screen in a manner similar to the example shown in FIG. 2.

A description will next be made of the case in which the video signal SV is derived from the EDTV2 broadcast. In this case, the memory 26 is supplied with the clock CLK1 of 14.3 MHz as the operating clock. Further, the memory 26 is supplied with the reset signal VRST1 so that write and read addresses are reset for each frame. Since the connecting switch 85 is turned OFF, no write and read enable signals WEN and REN are supplied to the memory 26 so that the writing of the data into and reading of it from the memory 26 are continuously carried out.

In this case, the video signal SV (8-bit data) is supplied to the memory 26 and sequentially written therein. Further, since the connecting switch 82 remains connected to the a side thereof, the 8-bit data read from the memory 26 after having been delayed by one frame period, is supplied via the changeover switch 82 to the subtracter 23 where it is subtracted from the video signal SV. Thus, a C-type three-dimensional comb filter is comprised of the memory 26 and the subtracter 23. Further, a composite signal ($C_{FL}$+HH'$_{FL}$) obtained by adding together a carrier chrominance signal $C_{FL}$ and a horizontal resolution supplementary signal HH'$_{FL}$ subjected to a frame-to-frame process is obtained from the subtracter 23.

Since the changeover switch 84 is electrically connected to the E side thereof, the memory 27 is supplied with the clock CLK3 of 14.3×2 MHz as the operating clock. Further, since the connecting switch 47 is electrically connected to the E side thereof, the memory 27 is supplied with the reset signal VRST2 so that write and read addresses are reset for each field. Since the connecting switch 85 is turned OFF, no write and read enable signals WEN and REN are supplied to the memory 27 so that the writing of data into and reading of it therefrom are continuously performed. Thus, a three-dimensional comb filter is constructed of the memory 27, bit converters 40 and 42 and subtracter 41 in a manner similar to the example shown in FIG. 2. A horizontal resolution supplementary signal HH' is separated from a composite signal (C+HH') outputted from the adder 34.

Other operation of the signal separation circuit 5 at the time of the EDTV2 broadcast is similar to that of the example shown in FIG. 2. A luminance signal Y, a carrier chrominance signal C and a horizontal luminance high-frequency component $Y_{HH}$ are outputted as the output data of the signal separation circuit 5. The number of pixels to be written into and read from the memories 26 and 27 upon EDTV2 broadcasting as described above is controlled to the number of pixels located only within a main figure portion (excluding overscanned pixels) in a manner similar to the example shown in FIG. 2.

Thus, even if the signal separation circuit 5 is configured as illustrated in FIG. 12, the capacity of a 3M-bit memory corresponding to the memories 26 and 27 can be efficiently used and the system can be integrated into compact form in the same manner as when the signal separation circuit 5 is configured as shown in FIG. 2. Further, an advantage can be brought about that when the signal separation circuit 5 is configured as shown in FIG. 12, the clock CLK2 of 14.3×⅔ MHz can be rendered unnecessary and the signal separation circuit 5 can be simplified in configuration.

Figure 17:
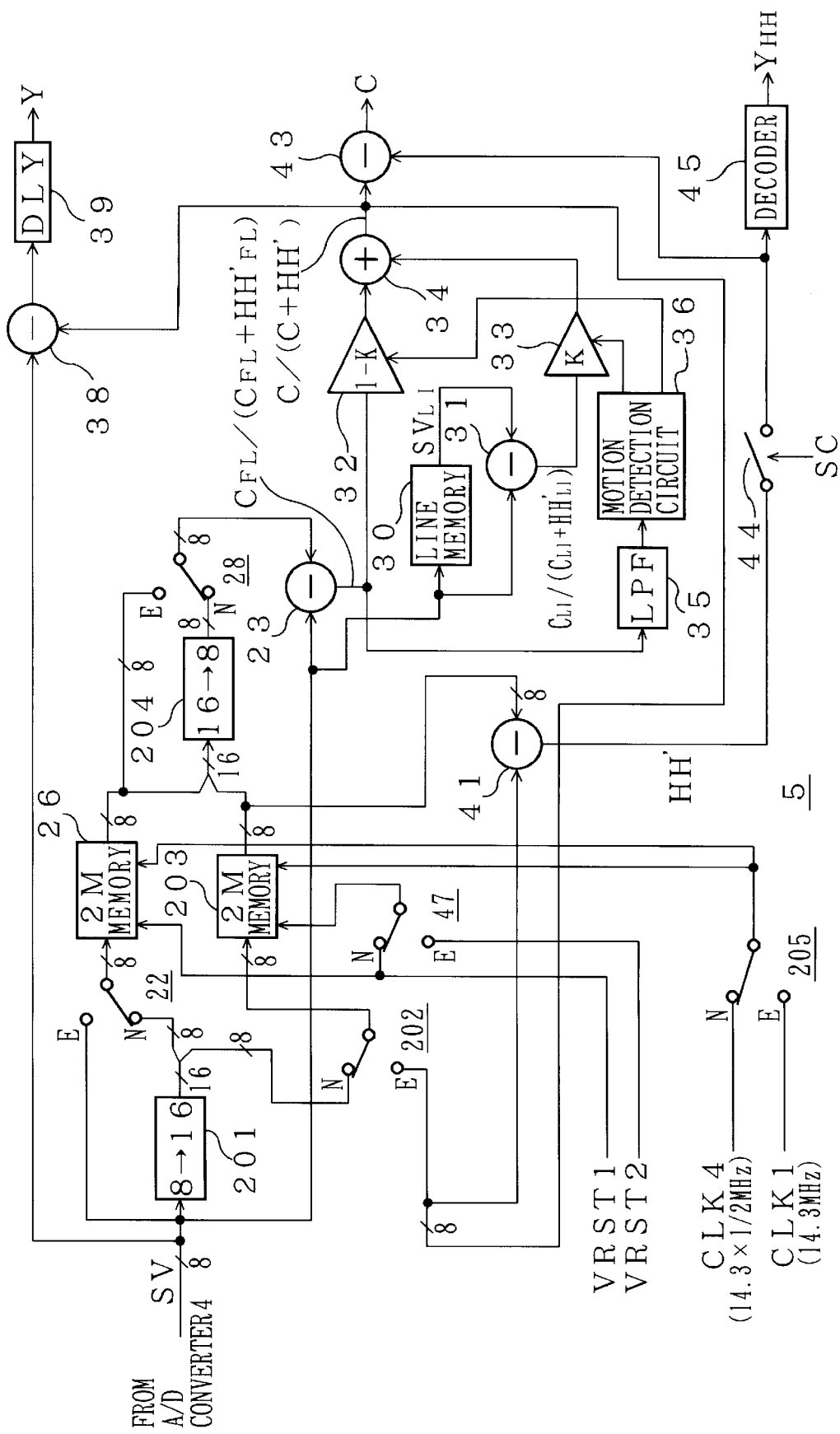
FIG. 17 is a block diagram depicting a further configuration of a signal separation circuit.

A further configuration of the signal separation circuit 5 will next be described with reference to FIG. 17. In FIG. 17, elements of structure corresponding to those shown in FIG. 2 are identified by like reference numerals and their detailed description will therefore be omitted. In the drawing, a video signal SV corresponding to 8-bit data outputted from an A/D converter 4 is supplied to a bit converter 201. The bit converter 201 is used to convert the 8-bit data into 16-bit data. The leftmost 8-bit data of the output data (16-bit data) of the bit converter 201 is supplied to a fixed terminal on the N side of a changeover switch 22, whereas the rightmost 8-bit data thereof is supplied to a fixed terminal on the N side of a changeover switch 202.

A fixed terminal on the E side of the changeover switch 202 is supplied with a composite signal (C+HH') used as 8-bit data outputted from an adder 34. The output data (8-bit data) of the changeover switch 202 is supplied to a 2M-bit memory (video RAM) 203 as write data. When the changeover switch 202 is selectively controlled based on a decision or criterion signal SC and the video signal SV is derived from an NTSC broadcast, the changeover switch 202 is electrically connected to the N side thereof. On the other hand, when the video signal SV is derived from an EDTV2 broadcast, the changeover switch 202 is electrically connected to the E side thereof.

Further, data (8-bit data) read from a memory 26 is supplied to a fixed terminal on the E side of a changeover switch 28. A bit converter 204 is supplied with composite data (16-bit data) obtained by adding together the read data (8-bit data) of the memory 26, which is defined as the leftmost 8-bit data and data (8-bit data) read from the memory 203, which is defined as the rightmost 8-bit data. The bit converter 204 is used to convert the 16-bit data into 8-bit data. The output data (8-bit data) of the bit converter 204 is supplied to a fixed terminal on the N side of the changeover switch 28. Further, data (8-bit data) outputted from the changeover switch 28 is supplied to a subtracter 23.

A fixed terminal on the E side of a changeover switch 205 is supplied with a clock CLK1 of 14.3 MHz, whereas a fixed terminal on the N side thereof is supplied with a clock CLK4 of 14.3×½ MHz. A signal outputted from the changeover switch 205 is supplied to the memories 26 and 203 as an operating clock. When the changeover switch 205 is now controlled by switching based on the criterion signal SC and the video signal SV is derived from the NTSC broadcast, the changeover switch 205 is electrically connected to the N side thereof. On the other hand, when the video signal SV is derived from the EDTV2 broadcast, the changeover switch 205 is electrically connected to the E side thereof. Thus, when the video signal SV is derived from the NTSC broadcast, the memories 26 and 203 are supplied with a clock CLK4 as an operating clock. When the video signal SV is derived from the EDTV2 broadcast, the memories 26 and 27 are supplied with the clock CLK1 as an operating clock. Other configuration of the signal separation circuit 5 shown in FIG. 17 is similar to the example shown in FIG. 2.

Figure 18:
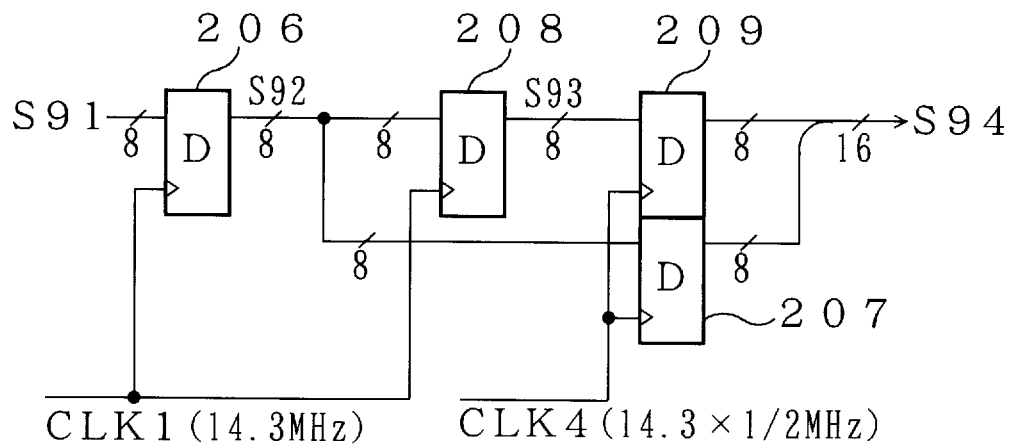
FIG. 18 is a connection diagram showing a configuration of a bit converter (8→16)

FIG. 18 shows the configuration of the bit converter 201. In the drawing, input 8-bit data (sampling frequency: 14.3 MHz) S91 is supplied to a latch 206 composed of a D flip-flop. 8-bit data S92 outputted from a latch circuit 206 is supplied to latch circuits 207 and 208 each composed of a D flip-flop. 8-bit data S93 outputted from a latch circuit 208 is supplied to a latch circuit 209 made up of a D flip-flop. Further, 8-bit data respectively outputted from the latch circuits 209 and 207 constitute 16-bit data (sampling frequency: 14.3×½ MHz) S94. In this case, the 8-bit data respectively outputted from the latch circuits 209 and 207 become the leftmost 8-bit data and rightmost 8-bit data of the output 16-bit data S94.

The latch circuits 206 and 208 are respectively supplied with a clock CLK1 (shown in FIG. 19A) of 14.3 MHz as a latch clock. Further, the latch circuits 207 and 209 are respectively supplied with a clock CLK4 (shown in FIG. 19B) of 14.3×½ MHz as a latch clock.

When the input 8-bit data S91 is represented as shown in FIG. 19C, the output data S92 of the latch circuit 206 is as illustrated in FIG. 19D and the output data S92 is supplied to the latch circuit 207. The output data S93 of the latch circuit 208 is represented as shown in FIG. 19E and supplied to the latch circuit 209. Thus, the output 16-bit data S94 (sampling frequency: 14.3×½ MHz) is obtained from the latch circuits 209 an 207 as shown in FIG. 19F.

Figure 20:
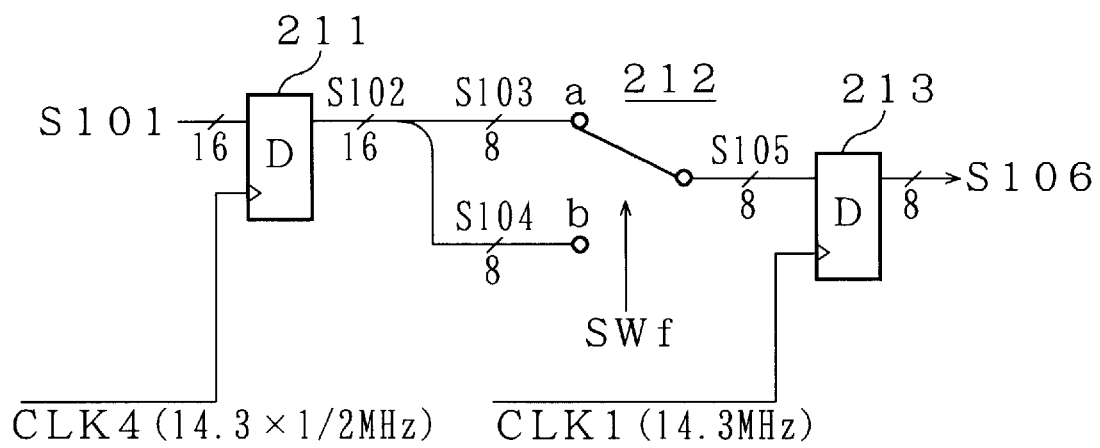
FIG. 20 is a connection diagram illustrating a configuration of a bit converter (16→8)

FIG. 20 illustrates the configuration of the bit converter 204. In the drawing, input 16-bit data (sampling frequency: 14.3×½ MHz) S101 is supplied to a latch circuit 211 composed of a D flip-flop. The leftmost 8-bit data S103 of 16-bit data S102 outputted from the latch circuit 211 is supplied to a fixed terminal on the a side of a changeover switch 212 which constitutes a selector, whereas the rightmost 8-bit data S104 thereof is supplied to a fixed terminal on the b side of the changeover switch 212.

Further, 8-bit data S105 outputted from the changeover switch 212 is supplied to a latch circuit 213 composed of a D flip-flop. Next, output 8-bit data S106 (sampling frequency: 14.3 MHz) is output from the latch circuit 213.

Furthermore, the latch circuit 211 is supplied with a clock CLK4 (shown in FIG. 21B) of 14.3×½ MHz as a latch clock. The latch circuit 213 is supplied with a clock CLK1 (shown in FIG. 21A) of 14.3 MHz as a latch clock. The changeover switch 212 is selectively changed to the a or b side in response to a switch control signal SWf (shown in FIG. 21C) synchronized with the clock CLK1.

When the input 16-bit data S101 is represented as shown in FIG. 21D, the output data S102 of the latch circuit 211 is represented as illustrated in FIG. 21E and the fixed terminals on the a and b sides of the changeover switch 212 are respectively supplied with 8-bit data S103 and S104 shown in FIGS. 21F and 21G. Thus, the 8-bit data S105 outputted from the changeover switch 212 is represented as shown in FIG. 21H and such output 8-bit data S106 (sampling frequency: 14.3 MHz) as shown in FIG. 21I is obtained from the latch circuit 213.

Figure 19:
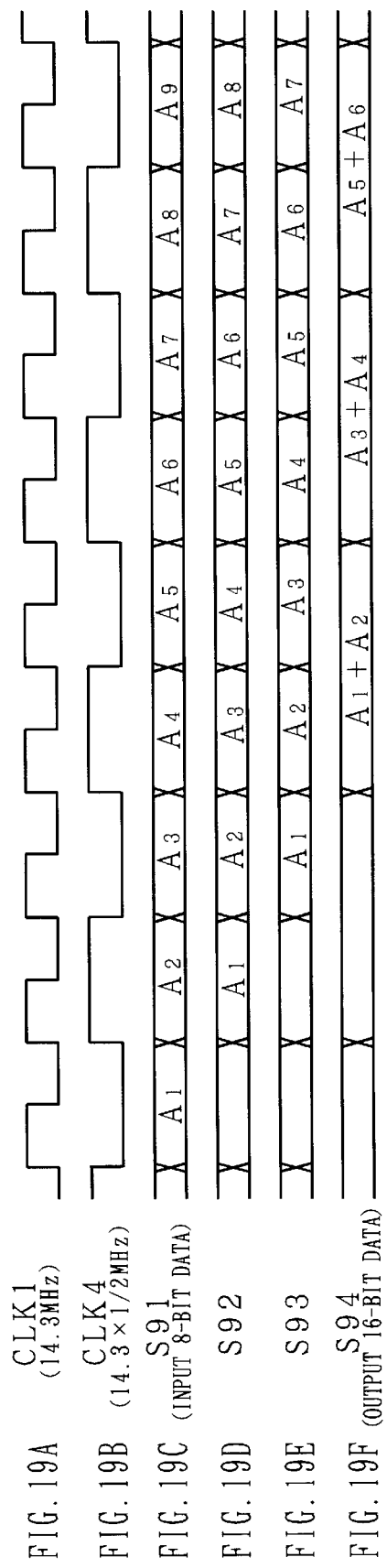
FIG. 19 including 19A–19F is a timing chart for describing the operation of the bit converter (8→16)
Figure 21:
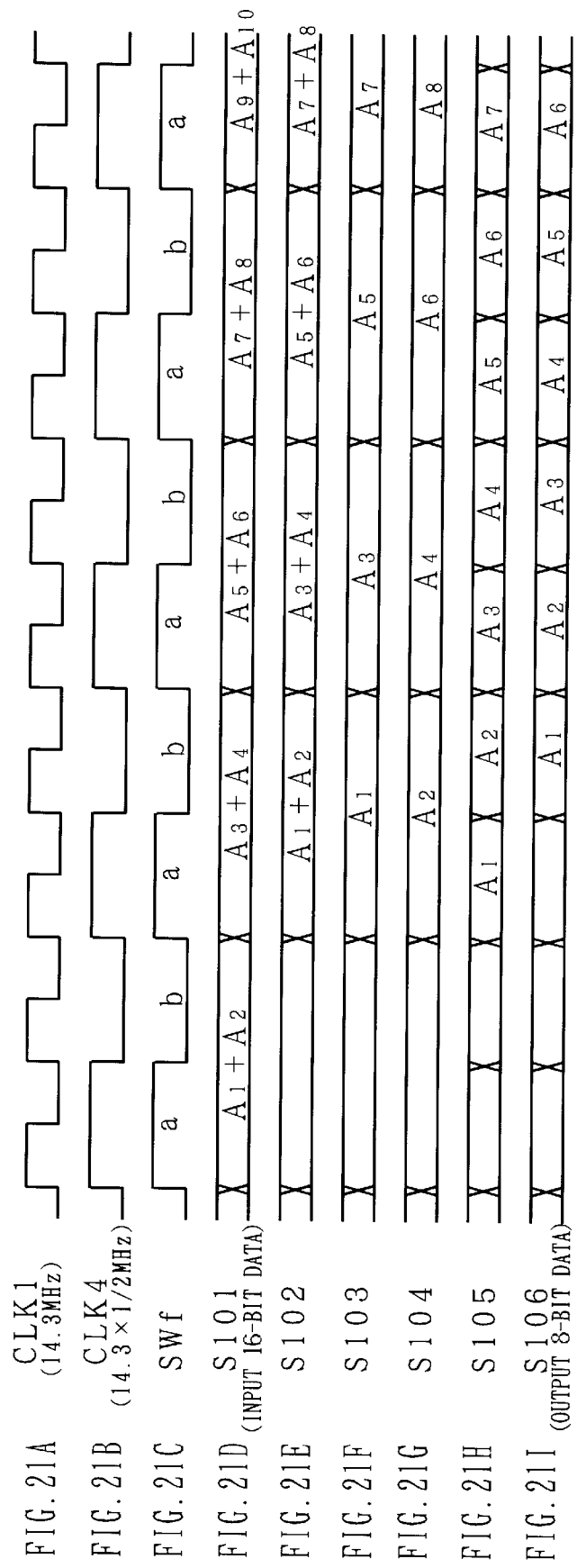
FIG. 21 including 21A–21I is a timing chart for describing the operation of the bit converter (16→8)
Figure 22:
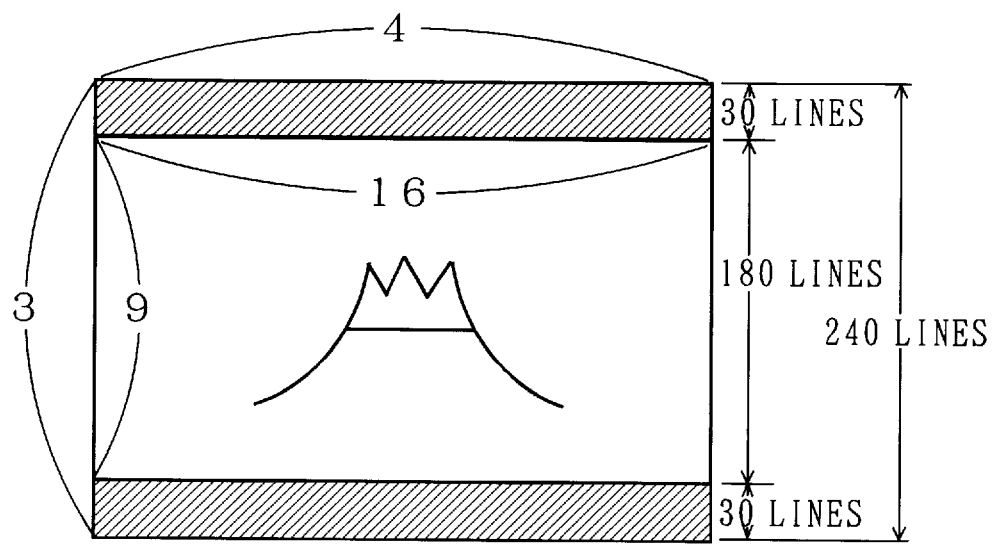
FIG. 22 is a diagram for describing a screen configuration of an EDTV2.
Figure 23:
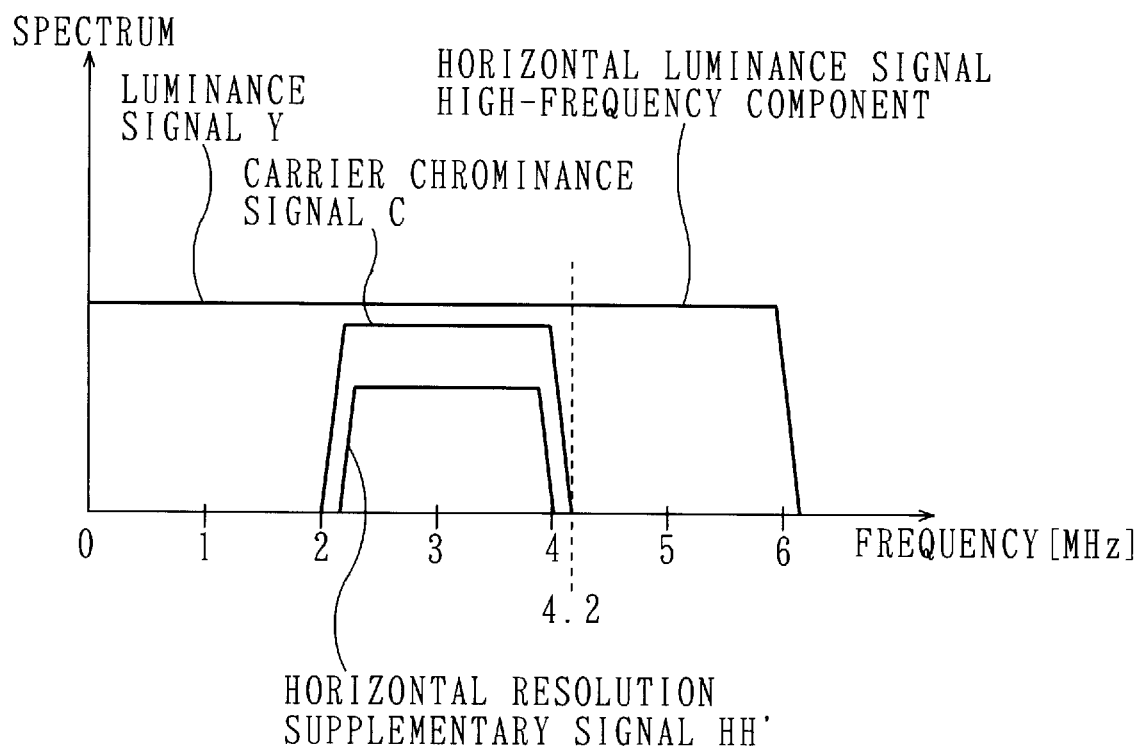
FIG. 23 is a diagram for describing a horizontal resolution supplementary signal employed in the EDTV2.

Incidentally, codes such as $A_1$, $A_2$, etc. applied to the data in FIG. 21 respectively correspond to those applied to the data in FIG. 19. If FIGS. 19 and 21 are taken in combination, it is then understood that the 16-bit data converted by and obtained from the bit converter 201 can be restored to the original 8-bit data by the bit converter 204.

The operation of the signal separation circuit 5 shown in FIG. 17 will next be described.

A description will first be made of the case in which the videos signal SV is derived from the NTSC broadcast. When a changeover switch 47 is electrically connected to the N side thereof in this case, the memories 26 and 203 are respectively supplied with a reset signal VRST1 so that write and read addresses are reset for each frame. Further, since the changeover switch 205 is electrically connected to the N side thereof, the memories 26 and 203 are respectively supplied with a clock CLK4 of 14.3×½ MHz as an operating clock.

Furthermore, the changeover switches 22, 202 and 28 are electrically connected to the N sides thereof. Therefore, the leftmost 8-bit data of 16-bit data (see the data S94 shown in FIG. 19F) obtained as a result of conversion of the video signal SV (refer to the data S91 shown in FIG. 19C) corresponding to 8-bit data by the bit converter 201 is supplied to the memory 26 and sequentially written therein. Further, the rightmost 8-bit data thereof is supplied to the memory 203 and sequentially written therein.

Next, 8-bit data (see the data S106 shown in FIG. 21I) obtained as a result of conversion of 16-bit data (see the data S101 shown in FIG. 21D) composed of 8-bit data respectively read from the memories 26 and 203 after having been delayed substantially by one frame period, is supplied via the changeover switch 28 to the subtracter 23 where it is subtracted from the video signal SV.

The amount of delay in data transmission by the bit converter 204 is taken into consideration although not described above. Further, the timing for reading the data from each of the memories 26 and 203, is controlled so that the 8-bit data supplied via the changeover switch 28 to the subtracter 23 from the bit converter 204 is delayed from the video signal SV by one frame period. Thus, a C-type three-dimensional comb filter is constructed of the memories 26 and 203, the bit converters 201 and 204 and the subtracter 23. A carrier chrominance signal $C_{FL}$ subjected to a frame-to-frame process is obtained from the subtracter 23.

Other operation of the signal separation circuit 5 at the time of the NTSC broadcast is similar to that of the example shown in FIG. 2. A luminance signal Y and a carrier chrominance signal C are outputted as the output data of the signal separation circuit 5. The number of. pixels to be written into and read from the memories 26 and 27 upon NTSC broadcasting as described above is controlled to the number of pixels located only within an effective screen in a manner similar to the example shown in FIG. 2.

A description will next be made of the case in which the video signal SV is derived from the EDTV2 broadcast. In this case, the memory 26 is supplied with a reset signal VRST1 so that write and read addresses are reset for each frame. Since the connecting switch 205 is electrically connected to the E side thereof, the memory 26 is supplied with a clock CLK1 of 14.3 MHz as an operating clock.

Further, the changeover switches 22 and 28 are respectively electrically connected to the E sides thereof. Therefore, a video signal SV corresponding to 8-bit data is supplied to the memory 26 and sequentially written therein. Next, the 8-bit data read from the memory 26 after having been delayed by one frame period, is supplied via the changeover switch 28 to the subtracter 23 where it is subtracted from the video signal SV. Thus, a C-type three-dimensional comb filter is constructed of the memory 26 and the subtracter 23. A composite signal ($C_{FL}+HH'_{FL}$) obtained by combining together a carrier chrominance signal $C_{FL}$ and a horizontal resolution supplementary signal $HH'_{FL}$ subjected to a frame-to-frame process can be obtained from the subtracter 23.

Since the changeover switch 205 is electrically connected to the E side thereof, the memory 203 is supplied with the clock CLK1 of 14.3 MHz as the operating clock. Since the changeover switch 47 is electrically connected to the E side thereof, the memory 203 is supplied with a reset signal VRST2 so that write and read addresses are reset for each field.

Further, the changeover switch 202 is electrically connected to the E side thereof. Therefore, a composite signal (C+HH') corresponding to 8-bit data is supplied to the memory 203 through the changeover switch 202 and sequentially written therein. Next, the 8-bit data read from the memory 203 after having been delayed by one field period, is supplied to a subtracter 41 where it is subtracted from the composite signal (C+HH'). Thus, a three-dimensional comb filter is constructed of the memory 203 and the subtracter 41. A horizontal resolution supplementary signal HH' is obtained from the subtracter 41 in accordance with a field-to-field process.

Other operation of the signal separation circuit 5 at the time of the EDTV2 broadcast is similar to that of the example shown in FIG. 2. A luminance signal Y, a carrier chrominance signal C and a horizontal luminance high-frequency component $Y_{HH}$ are outputted as the output data of the signal separation circuit 5. The number of pixels to be written into and read from the memories 26 and 203 upon EDTV2 broadcasting as described above is controlled to the number of pixels located only within a main figure portion (excluding overscanned pixels) in a manner similar to the example shown in FIG. 2.

Thus, even if the signal separation circuit 5 is configured as illustrated in FIG. 17, the capacity of a 4M-bit memory corresponding to the memories 26 and 203 can be efficiently used and the system can be integrated into compact form in the same manner as when the signal separation circuit 5 is configured as shown in FIG. 2. Further, an advantage can be brought about that when the signal separation circuit 5 is configured as shown in FIG. 17, the memories or the like can be avoided from operating at high speed in accordance with the clock CLK2 of 14.3×2 MHz and hence the system can be easily controlled.

In the aforementioned embodiments, the 2M-bit memory 26 and the 1M-bit memory 27 or the 2M-bit memory 26 and the 2M-bit memory 203 are used. It is however needless to say that the memory capacity is not necessarily limited to this.

According to the present invention, in regard to a first video signal obtained by combining a luminance signal and a carrier chrominance signal together, first and second memories are used to constitute a first signal separation section. The luminance signal and the carrier chrominance signal are separated from the first video signal by the first signal separation section. In regard to a second video signal obtained by combining a luminance signal, a carrier chrominance signal and a horizontal resolution supplementary signal together, the first memory is used to constitute a second signal separation section. The luminance signal and the composite signal composed of carrier chrominance signal and horizontal resolution supplementary signal are separated from the second video signal by the second signal separation section. Further, the second memory is used to configure a third signal separation section. The carrier chrominance signal and horizontal resolution supplementary signal are separated from the composite signal by the third signal separation section. It is therefore possible to efficiently use the memory capacity and integrate the system into compact form.

Further, a signal discriminating means makes a decision as to whether a received video signal is the first video signal or the second video signal. Based on the result of decision, the first signal separation section or the second and third signal separation sections are controlled so as to be placed in a used state, thereby making it possible to improve user's operability.

As many apparently different embodiments of this invention may be made without departing from the spirit and scope thereof, it is to be understood that the invention is not limited to the specific embodiments thereof except as defined in the appended claims.

What is claimed is:

1. A signal separator for separating a luminance signal and a carrier chrominance signal from a first video signal representative of a number of frames and produced by combining the luminance signal with the carrier chrominance signal and for separating a luminance signal, a carrier chrominance signal and a horizontal resolution supplementary signal from a second video signal representative of a number of frames and produced by combining the luminance signal, the carrier chrominance signal and the horizontal resolution supplementary signal together, comprising:

a first signal separation section for separating the luminance signal and the carrier chrominance signal from said first video signal using first and second memories each having less than one frame of storage capacity;

a second signal separation section for separating the luminance signal and the signal produced by combining the carrier chrominance signal with the horizontal resolution supplementary signal from said second video signal using said first memory; and a third signal separation section for separating the carrier chrominance signal and the horizontal resolution supplementary signal from said combined signal using said second memory.

2. A signal separator according to claim 1, wherein said first and second memories are used to constitute a three-dimensional comb filter in said first signal separation section and said first memory is used to constitute a three-dimensional comb filter in said second signal separation section.

3. A signal separator according to claim 1, wherein in said first signal separation section, said first video signal is divided into two signals, which are respectively processed so as to be written into said first and second memories.

4. A television receiver capable of receiving a first video signal representative of a number of frames and produced by combining a luminance signal with a carrier chrominance signal and capable of receiving a second video signal representative of a number of frames and produced by combining a luminance signal, a carrier chrominance signal and a horizontal resolution supplementary signal together, comprising:

a first signal separation section for separating the luminance signal and the carrier chrominance signal from said first video signal using first and second memories each having less than one frame of storage capacity;

a second signal separation section for separating the luminance signal and the combined signal of the carrier chrominance signal and the horizontal resolution supplementary signal from said second video signal using said first memory; and a third signal separation section for separating the carrier chrominance signal and the horizontal resolution supplementary signal from said combined signal using said second memory;

whereby upon receipt of said first video signal, the luminance signal and the carrier chrominance signal are separated from said first video signal by said first signal separation section; and upon receipt of said second video signal, the luminance signal and the combined signal of the carrier chrominance signal and the horizontal resolution supplementary signal are separated from said second video signal by said second signal separation section, and the carrier chrominance signal and the horizontal resolution supplementary signal are separated from said combined signal by said third signal separation section.

5. A television receiver according to claim 4, wherein said first and second memories are used to constitute a three-dimensional comb filter in said first signal separation section and said first memory is used to constitute a three-dimensional comb filter in said second signal separation section.

6. A television receiver according to claim 4, wherein in said first signal separation section, said first video signal is divided into two signals, which are respectively processed so as to be written into said first and second memories.

7. A television receiver according to claim 4, further including signal discriminating means for determining whether a received video signal is either said first video signal or said second video signal; and operation control means for putting said first signal separation section or said second and third signal separation sections into use according to the result of determination by said signal discriminating means.

* * * * *